United States Patent [19]

Tomii et al.

[11] Patent Number: 4,703,231
[45] Date of Patent: Oct. 27, 1987

[54] FLAT TYPE IMAGE DISPLAY TUBE AND DISPLAY DEVICE USING THE SAME

[75] Inventors: Kaoru Tomii, Isehara; Hiroshi Miyama, Yokohama; Yoshikazu Kawauchi, Kawasaki; Jun Nishida, Shibuya, all of Japan

[73] Assignee: Matsushita Electric Industrial Co., Ltd., Kadoma, Japan

[21] Appl. No.: 748,833

[22] Filed: Jun. 26, 1985

[30] Foreign Application Priority Data

| Jun. 26, 1984 | [JP] | Japan | 59-131329 |
| Jul. 12, 1984 | [JP] | Japan | 59-144617 |
| Oct. 29, 1984 | [JP] | Japan | 59-227136 |
| Oct. 29, 1984 | [JP] | Japan | 59-227149 |
| Mar. 6, 1985 | [JP] | Japan | 60-44057 |

[51] Int. Cl.⁴ ............................................. H01J 29/70
[52] U.S. Cl. ................................. 315/366; 315/368; 313/422; 358/69
[58] Field of Search ............... 315/366, 368; 313/422; 358/69

[56] References Cited

U.S. PATENT DOCUMENTS

| 4,003,082 | 1/1977 | Fumoto | 358/69 |
| 4,118,650 | 10/1978 | Scott | 315/366 |
| 4,194,140 | 3/1980 | Hamano et al. | 358/69 |
| 4,263,614 | 4/1981 | Tominaga | 358/69 |
| 4,352,047 | 9/1982 | Imayasu et al. | 358/69 |
| 4,364,079 | 12/1982 | Pons | 315/368 |
| 4,364,083 | 12/1982 | Isono et al. | 358/69 |
| 4,376,260 | 3/1983 | Russell | 315/366 |
| 4,417,184 | 11/1983 | Takesako et al. | 315/366 |
| 4,451,846 | 5/1984 | Iyehara et al. | 315/366 |
| 4,525,653 | 6/1985 | Smith | 313/422 |

Primary Examiner—Theodore M. Blum
Assistant Examiner—David Cain
Attorney, Agent, or Firm—Wenderoth, Lind and Ponack

[57] ABSTRACT

In a flat image display tube, a phosphor screen having an image display region and index region, a plurality of electron beam generators and a plurality of horizontal deflection electrodes are provided. The image display region has three primary color phosphor stripes and each is sequentially arranged alternately with black stripes in a horizontal direction. The index region is arranged adjacent to the image display region and has index phosphor stripes arranged in a predetermined relationship to the three primary color phosphor stripes.

12 Claims, 40 Drawing Figures

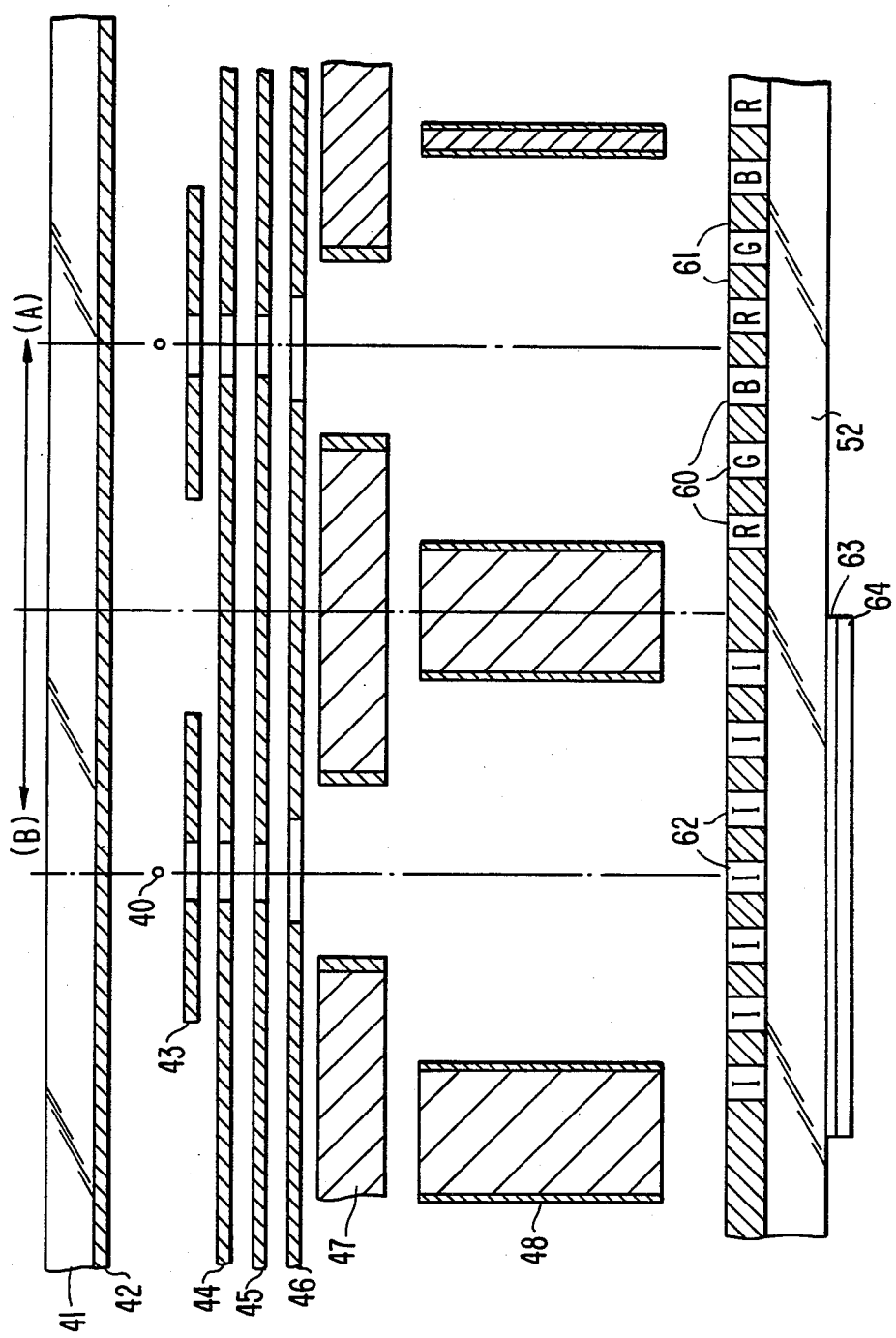

FLAT TYPE IMAGE DISPLAY TUBE AND DISPLAY DEVICE USING THE SAME

BACKGROUND OF THE INVENTION

The present invention relates to a flat image display tube for a color television receiver or a computer output display. Several ideas relating to flat cathode ray tubes or image displays are known in television engineering. The applicant has recently applied for a U.S. patent relating to a flat cathode ray tube. The flat cathode ray tube has a small depth relative to an image screen size. Electron beams generated by heating vertically extending linear thermal cathodes are sequentially and vertically switched by a plurality of vertical scanning electrodes extending vertically and arranged perpendicularly to the linear thermal cathodes, transmitted through an electrode having apertures formed therein corresponding to the linear thermal cathodes, horizontally deflected by horizontal deflection electrodes, and directed to a phosphor layer. The electron beams are modulated by applying a modulation pulse voltage together with a heating D.C. voltage to the linear thermal cathodes, or by applying a modulation pulse signal to a modulation electrode arranged close to the electron beam generating electrode.

In the flat cathode ray tube, electron beams emitted from the linear thermal cathodes which are arranged equidistantly in a horizontal direction must impinge the phosphor screen in an equidistant relationship in a horizontal direction when no horizontal deflection voltage is applied. If the equidistance is shifted, the electron beams impinge upon an undesired phosphor which causes a share in hue of the displayed color image. To correct the share in hue, it is necessary to apply a high correction voltage to the horizontal deflection electrodes which requires an expensive and complex circuit.

The share in hue moreover occurs in the above mentioned cathode ray tube when the amplitude of the horizontal deflection is varied.

In addition to those, electron beams impinged onto the phosphor screen through apertures of electrodes are not equal with respect to each other because of the difference of electron emission chracteristics of the linear thermal cathodes, and the difference of the aperture sizes of the electrodes. The inequality of the electron beams make a white image partially dark and deteriorates the quality of the image.

SUMMARY OF THE INVENTION

It is therefore an object of the present invention to provide a flat color display device which has a high color fidelity without a share in hue.

It is another object of the present invention to correct the beam landing in a horizontal direction.

It is another object of the present invention to make the electron beam emission characteristics of a plurality of linear cathodes uniform.

According to the present invention, a flat color display device is provided which comprises a phosphor screen having a image display region and an index region, a plurality of linear cathodes for generating electron beams arranged in a horizontal direction and substantially parallel with the phosphor screen, a plurality of electrodes for vertical scanning, horizontal scanning and beam modulation and horizontal deflection electrodes for horizontally deflecting the electron beams. The image display region comprises a plurality of phosphor strips of three primary colors each successively arranged alternately with black strips, and the index region comprises a plurality of index phosphor strips each arranged alternatively with black strips. When an electron beam scans the index strips, the index strips generate a light emission. The emitted light is converted into an electrical signal by a photoelectric device, and the electrical signal controls the timing of the color video signal supplied to the beam modulation electrode.

In another embodiment, an electrode is further provided to detect the amount of the electron beam flowing thereinto. The detected amount of the electron beam is so controlled as to maintain a constant value.

BRIEF DESCRIPTION OF THE DRAWINGS

The object and features of the present invention will become more readily apparent from the following detailed description of the preferred embodiments taken in conjunction with the accompanying drawings in which:

FIG. 10 is a cross-sectional plane view of a flat type display tube in accordance with a second embodiment of the present invention;

DETAILED DESCRIPTION OF THE INVENTION

In order to aid the understanding of the present invention, a flat cathode ray tube in our copending application will be explained.

Figure 1:
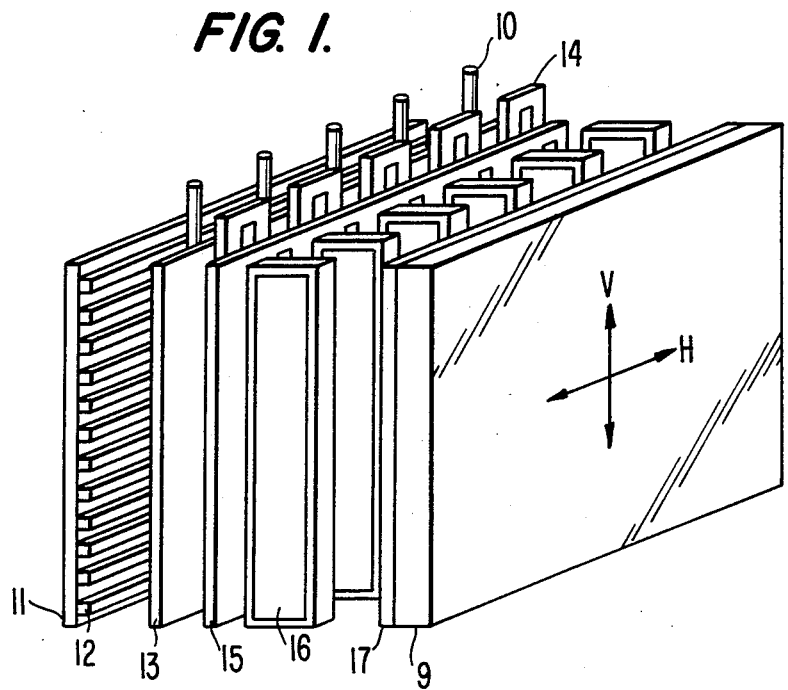
FIG. 1 is a perspective view of a flat cathode ray tube in accordance with our copending patent application.

In FIG. 1, electrodes are contained in a vacuum enclosure (glass vessel), but the vacuum enclosure is omitted in FIG. 1 to clearly show the internal electrodes. Only a portion of the face constituting the vacuum enclosure is shown. In order to define horizontal and vertical directions of a screen on which an image or character is displayed, the horizontal direction (H) and the vertical direction (V) are shown on the face plate. A plurality of linear thermal cathodes 10 made of tungsten wires having oxide cathodes formed on the surfaces thereof are arranged separately and horizontally at regular intervals, and appropriate tensions are vertically applied thereto. The number of linear thermal cathodes 10 and the spacing are of a design matter. For example, when the diagonal dimension of the display area is 10 inches, the horizontal space is approximately 10 mm and 20 linear thermal cathodes 10 having a vertical length of approximately 160 mm are arranged. Electrically isolated and horizontally (H) extending vertical scanning electrodes 12 are arranged at a regular pitch in the vertical direction (V) on an insulator support 11 positioned close to the linear thermal cathodes 10 and opposite to its side of the face plate 9. The vertical scan electrodes 12 are metal films or oxide films of conductive material and formed by photo-etching, mask vapor-depostion or screen printing. In order to display the conventional television image, 490 vertical scan electrodes 12 are vertically arranged. Arranged between the linear thermal cathodes 10 and the face plate 9 are a first planar grid electrode 13 having apertures formed at positions corresponding to the linear thermal cathodes 10 to focus and accelerate the electron beam, second modulation grid electrodes 14 one for each of the linear thermal cathodes 10, electrically isolated and having electron beam transmission apertures, and a third grid electrode 15 having a similar shape to the first grid electrode 13. Horizontal deflection electrodes 16 for horizontally deflecting the electron beams transmitted through the electron beam transmission apertures formed in the electrodes 13, 14 and 15 are arranged so as to be electrically isolated and facing the electron beams transmitted through the apertures of the electrodes. The horizontal deflection electrodes 16 have metal films formed so as to be electrically isolated on both surfaces of substrates such as insulating supports. A layer 17 which emits light upon stimulation by the electron beam is arranged on the inner surface of the face plate 9. It is formed by a phosphor or a metal-back layer. The phosphor may be of one layer for a monochromatic display, and red, green and blue stripes or dots are formed for a color display.

Figure 2:
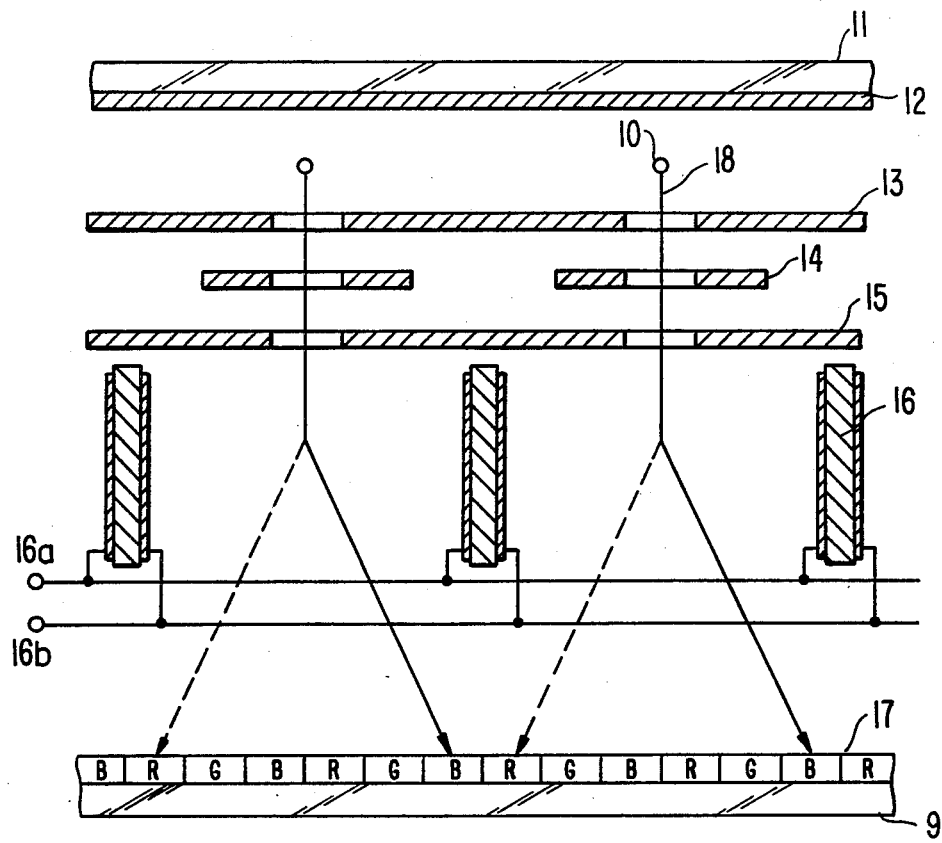
FIG. 2 is a cross-sectional plane view of the structure of FIG. 1.

Referring to FIGS. 2 and 3, the operation of the flat cathode ray tube is described. FIG. 2 is a horizontal sectional view of the flat cathode ray tube shown in FIG. 1. Electrons generated by heating the linear thermal cathodes 10 pass through the electron beam transmission apertures of the first grid electrode 13 opposing to the linear thermal cathodes 10, by an electric field established between the vertical scanning electrodes 12 on the back of the linear thermal cathodes 10 and the first grid electrode 13. While the electron beams are not visible, loci 18 of the electron beams are shown for easiness of understanding. The electron beams transmitted through the apertures of the first grid electrode 13 are modulated (e.g. on-off modulation) by the second modulation grid electrodes 14 each of which corresponds to each of the linear thermal cathodes 10 and each of which is electrically isolated from others. If the tube is used for a color display, sequential modulation signals designated as red, green, blue, red, green, blue - - - are applied. The electron beams produced by the linear thermal cathodes 10 are modulated by respective modulation signals. The third grid electrode 15 having the similar shape as the first grid electrode 13 presents a shield effect and horizontally focuses the electron beams. The horizontal deflection electrodes 16 are arranged one for each linear thermal cathode 10 to face the electron beam. A sawtooth or stepwise horizontal deflection voltage is applied to the horizontal deflection electrodes 16 through wires 16a and 16b so that the electron beams are horizontally deflected by a predetermined length. The horizontally deflected electron beams are then electrically accelerated and stimulate the light emitting layer 17 formed on the inner surface of the face plate 9 so that the light emitting layer 17 emits light. When a color display is required, the electron beams are horizontally deflected and modulation signals for the respective colors are supplied to the second modulation grid electrodes 14 at predetermined positions for the respective colors so that a color image is displayed.

Figure 3A:
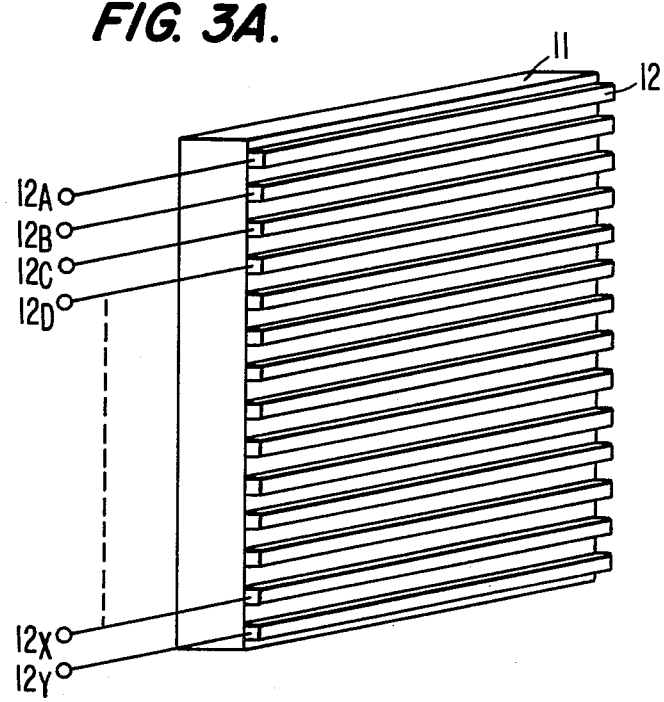
FIGS. 3A-3B illustrate a vertical scanning operation performed by the structure of FIG. 1.
Figure 3B:
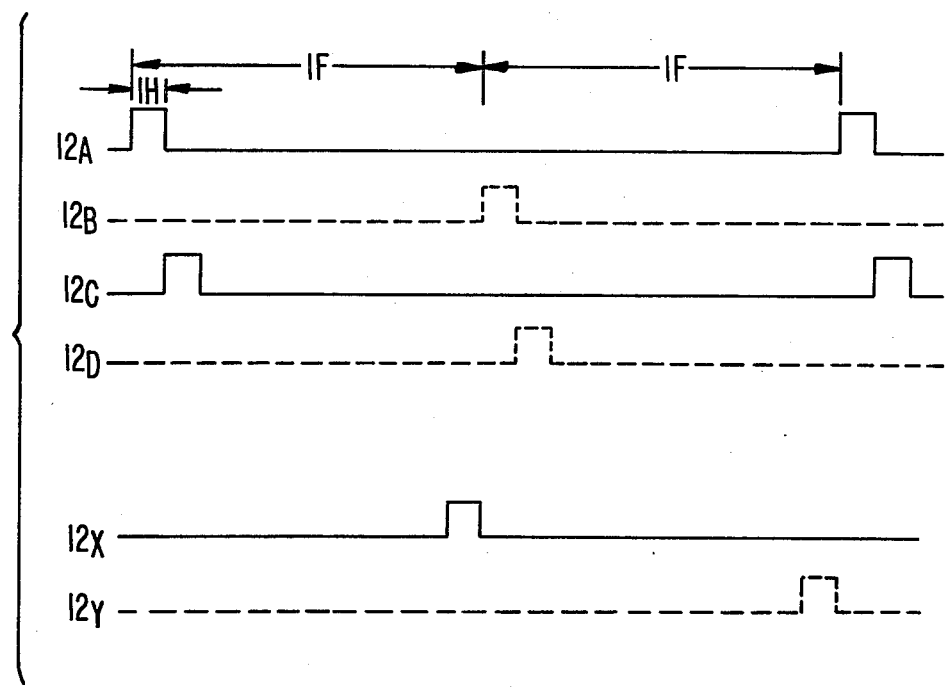

The electron beams 18 produced by the linear thermal cathodes 10 are modulated by the modulation signals and horizontally focused and deflected so that selected areas of the phosphor 17 emit light as described above. The electron beams should also be switched in the vertical direction for each scanning line. When the television image is to be displayed, for example, as shown in FIGS. 3A-3B in order to effect vertical switching of the electron beams, 490 electrically separated vertical scanning electrodes 12 are arranged at the back of the linear thermal cathodes 10. The electrodes are formed by metal films or a conductive material such as oxide films on the insulator 11 by photo-etching technique. Alternatively, a metal plate may be photo-etched. A vertical scanning signal is applied to each of the separated vertical scanning electrodes 12. The applied signal effects an "ON" or "OFF" operation of the electron beams. In a first field, the electron beam is turned on only for a 1H-period by the signal applied to a terminal 12A. The signal for turning on the electron beam only for a next 1H-period is applied to a terminal 12C, and so on. Thus, similar signals each thereof turning on the electron beam for a 1H-period are applied to everyother vertical scanning electrode. When the signal is applied to a terminal 12X at the bottom of the screen, the scan for the first field is completed, and then an interlace scan is initiated to vertically scan a second field. In the second field, signals each thereof turning on the electron beam only for a 1H-period are applied, starting from a terminal 12B to every other subsequent terminal. When the signal is applied to the lowermost terminal 12Y, the scan for one frame is completed.

The aforementioned flat cathode ray tube improves an electron beam spot size and uniformity but has a problem relating to color reproduction quality or uniformity in luminance.

The embodiments of the present invention will now be explained.

Figure 4:
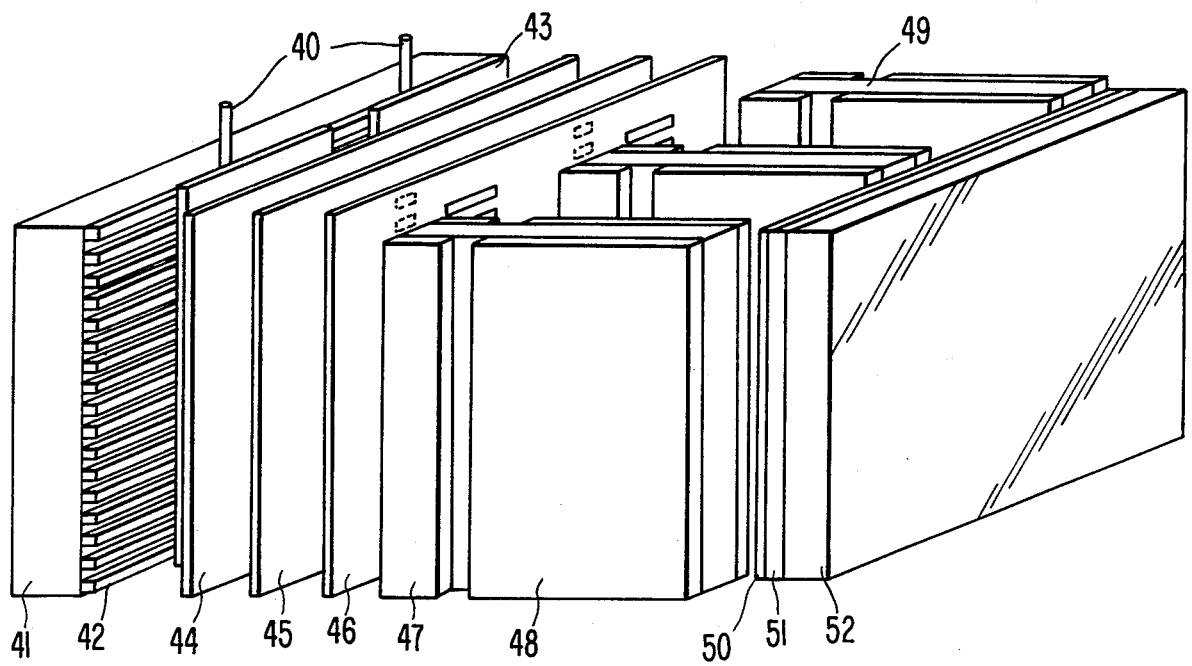
FIG. 4 is a perspective view showing a structure of a flat display tube in accordance with a first embodiment of the present invention.
Figure 5:
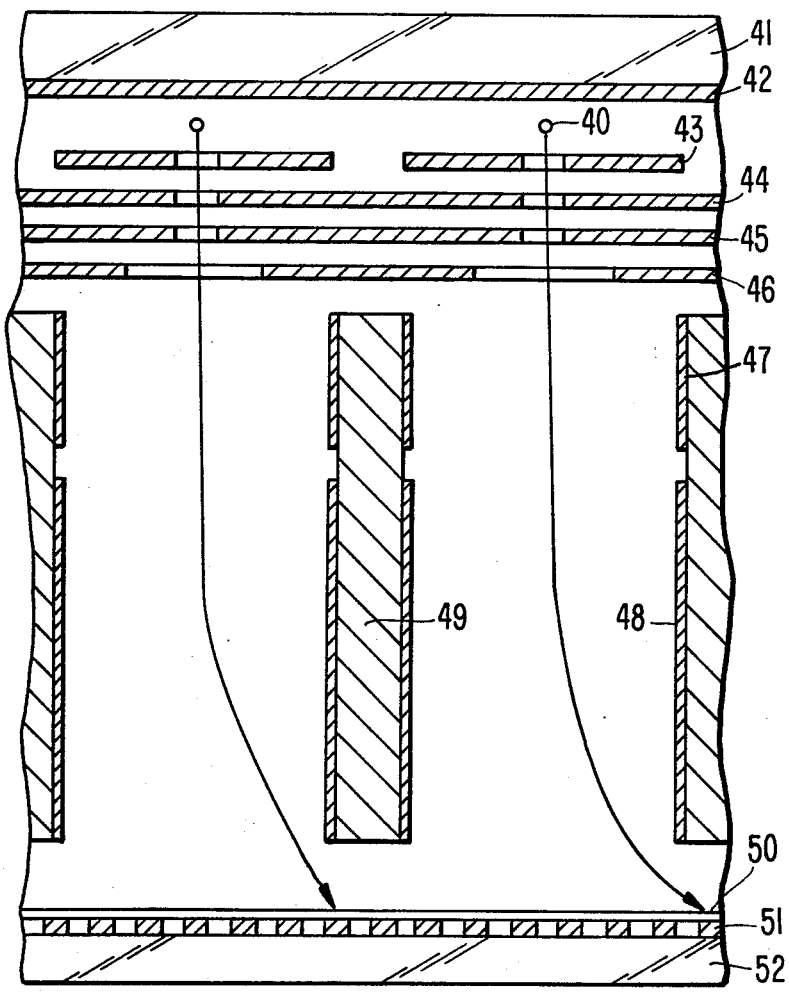
FIG. 5 is a cross-sectional plane view of the structure of FIG. 4.
Figure 6:
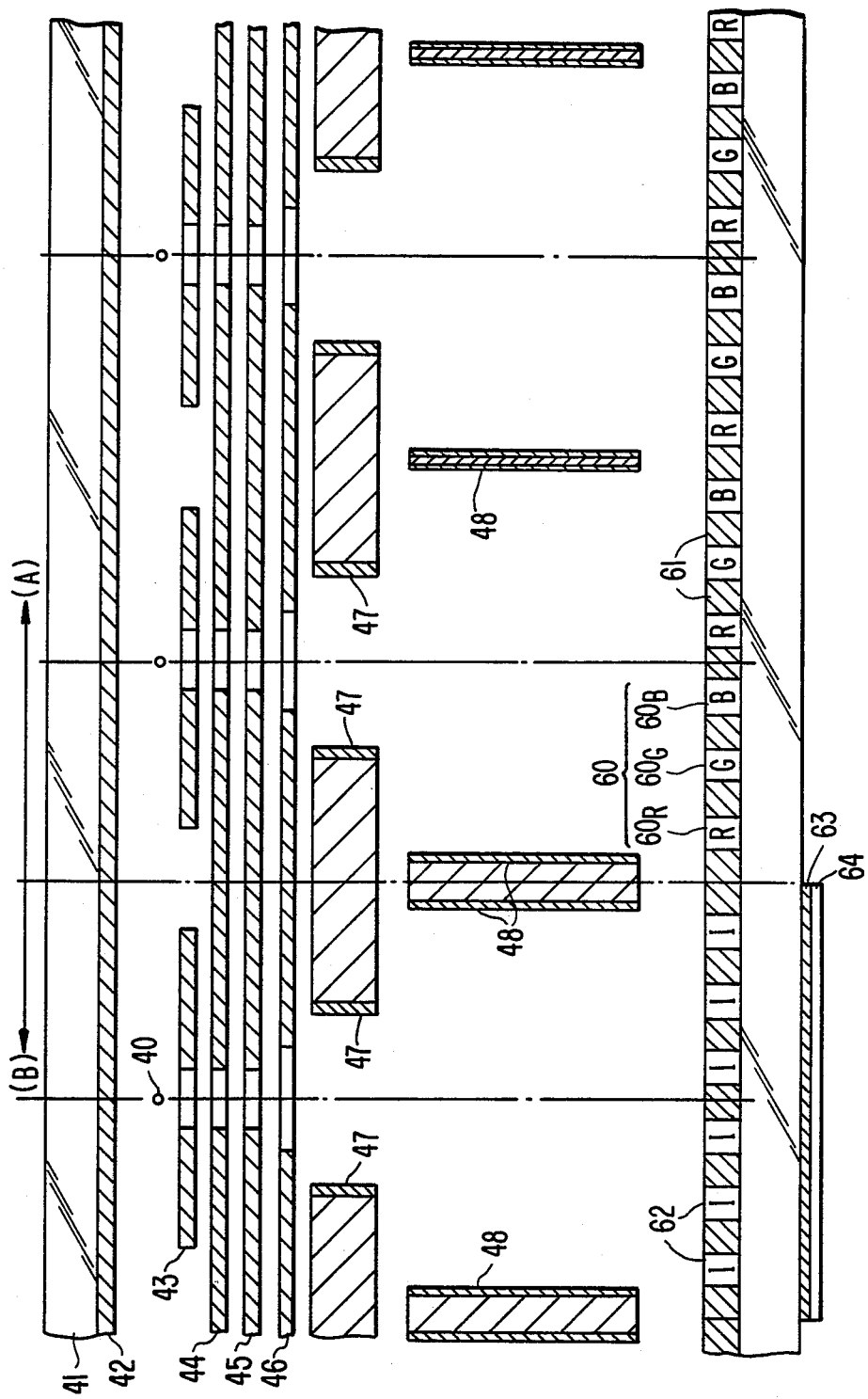
FIG. 6 is a cross-sectional plane view showing the relationship between the electrodes and phosphor screen of the structure of FIG. 4.

Referring now to FIGS. 4 and 5, a plurality of linear cathodes 40, which are elongated in vertical direction, are arranged in a horizontal direction with equal pitch in a location corresponding to an image display region. One linear cathode is further provided in a location corresponding to an index region. At rear side of the linear cathodes 40, a plurality of vertical scanning electrodes 42, which are provided on a insulating member 41, are arranged in a vertical direction with equal pitch. The vertical scanning electrodes 42 are extended in a horizontal direction and separated electrically from each other. In order to display the NTSC television image, 480 vertical scanning electrodes 42 are vertically arranged. Arranged between the linear cathodes 42 and a face plate 52 are a first grid electrode 43 (hereafter called the "$G_1$ electrode") of a plurality of separated electrodes each having apertures forming at positions corresponding to the linear cathodes 40 to modulate the electron beam with video signals, a second grid electrode 44 (hereafter called the "$G_2$ electrode") of a planer electrode having apertures which are the same as those of the $G_1$ electrode 43, a third grid electrode 45 (hereafter called the "$G_3$ electrode") having the same structure of as that of the $G_2$ electrode, a fourth grid electrode 46 (hereafter called the "$G_4$ electrode") of a planer electrode having apertures wider in a horizontal direction than those of the $G_2$ electrode or the $G_3$ electrode, a horizontal focusing electrode 47 (hereinafter called the "$F_H$ electrode") for horizontally deflecting slightly and horizontally focusing the electron beams transmitted through the apertures of each of said electrodes 43, 44, 45 and 46, and deflecting electrodes 48 (hereafter called the "$D_H$ electrode") for horizontally deflecting the electron beam successively. On an inner surface of the face plate 52, a light emitting layer composed of phosphor layer 51 and metal back electrode 50 is provided. As illustrated in FIG. 6, the phosphor layer 51 has an image display region A and an index region B. The image display region comprises three primary color stripes 60 of red R, green G and blue B, and black stripes 61 each arranged successively. The index region comprises index stripe phosphors 62 and black stripes, and the electrode construction is the same as that of the image display region. The index phosphors consist of near infrared phosphors or one of the three primary color phosphors. On the outside of the face plate 52, a filter 63 for transmitting the light from the index stripe phosphors 62 and a photoelectric device 64 for converting the light signals from the filter into electrical signals are arranged.

The linear cathodes 40 emit electron beams when they are heated by applying prescribed potential voltage. When voltages nearly equal to the cathode potential are applied to the vertical scanning electrodes 42 and the $G_1$ electrode 43, and a voltage (about 100–300 V) which is higher than the cathode potential is applied to the $G_2$ electrode 44, the electron beams transmit through the apertures of the $G_1$ and $G_2$ electrodes. The amount of the transmitting electron beams are adjustable by regulating the potential of the $G_1$ electrode 43. The electron beams further transmit to the $G_3$ electrode 45, the $G_4$ electrode 46 and the $F_H$ electrode 47 one after the other. These electrodes further operate to focus the electron beams so as to make beam spot size on the phosphor layer 51 small by applying a predetermined voltage thereto. The electron beams transmitted through the $F_H$ electrode 47 scan the phosphor layer 51 by applying a saw tooth or stepped deflection voltage having a horizontal scanning period to the $D_H$ electrode 48. The operation of vertical scanning is same as that described in FIGS. 3A and 3B, and therefore, a detailed description is not repeated.

Figure 7:
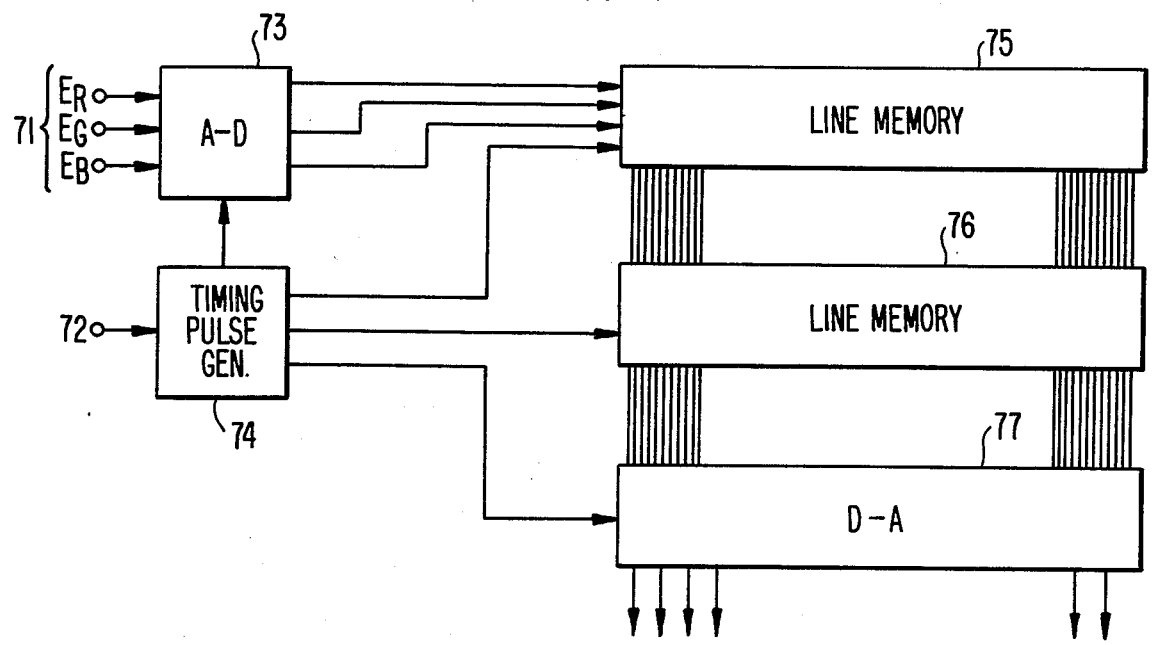
FIG. 7 is a block diagram of a video signal processing portion of a flat display device in accordance with the present invention.
Figure 8:
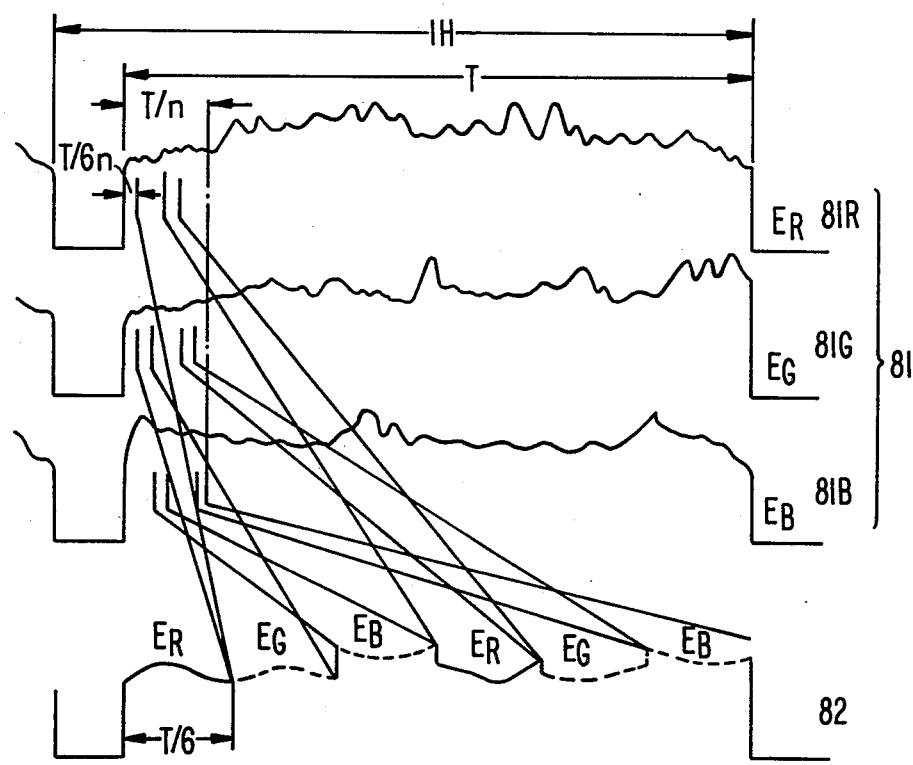
FIG. 8 is a waveform chart for explaining an operation of the block diagram in FIG. 7.

Referring now to FIG. 7, a timing pulse generator 74 generates several timing pulses for driving A-D converter 73, line memories 75 and 76 and D-A converter 77 with the input of a television sychronizing signal 72. A-D converter 73 converts the demodulated three primary color signals ($E_R$, $E_G$, $E_B$) 71 into digital signals under the control of one of the timing pulses, and supplies the demodulated digital signals corresponding to one horizontal scanning period (hereafter called "1H") to a first line memory 75. When the 1H signals have been input into the first line memory 75, the input 1H signals are transferred to a second line memory 76 and the next 1H signals are input to the first line memory 75. The second line memory 76 holds the transferred 1H signals within 1H period and transfers the signals into the D-A converter or pulse width converter 77 to convert the digital signals into analog signals or pulse width modulated signals. The converted signals are amplified and supplied to the $G_1$ electrode 43 of the display tube. The line memories 75 and 76 are used for time axis conversion and the detailed operation thereof will be discussed with reference to FIG. 8.

Assuming that the number of electron beams (which corresponds to the number of line cathodes 40) for scanning the image display region is n, the horizontal scanning width of each electron beam is two triplets (one triplet corresponds to the width of a set of three primary color phosphor stripes), then each of the R, G, B color signals 81 are divided into T/n and each of the divided video signals are enlarged n times with respect to the time axis. Each of the time-enlarged primary color signals are gated by gate pulses of a pulse width of T/6 to convert them into a time sequential signal 82 which is supplied to the $G_1$ electrode 43 to modulate the electron beams. The 1H video image is thus obtained.

The time sequential color signals supplied to the $G_1$ electrode must have their timing adjusted with respect to the phosphor location to which the electron beam is impinged. That is to say, the electron beam modulated with the red R signal must land on the red R phosphor stripes of the screen. The index region in FIG. 6 is provided to generate an index signal which controls the timing mentioned above.

Figure 9A:
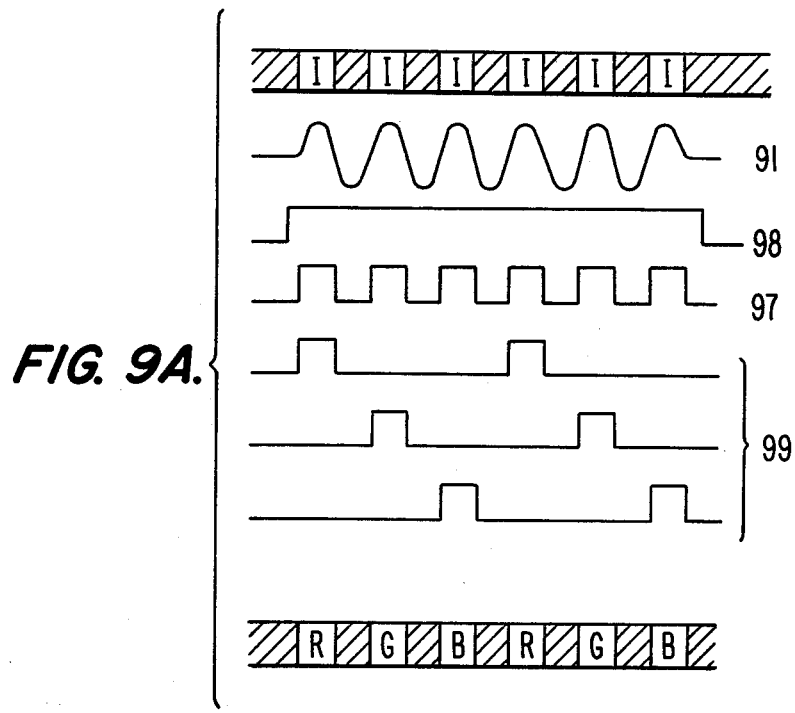
FIGS. 9A and 9B are a waveform chart and a block diagram of an index signal processing portion of the flat display device in accordance with the present invention.
Figure 9B:
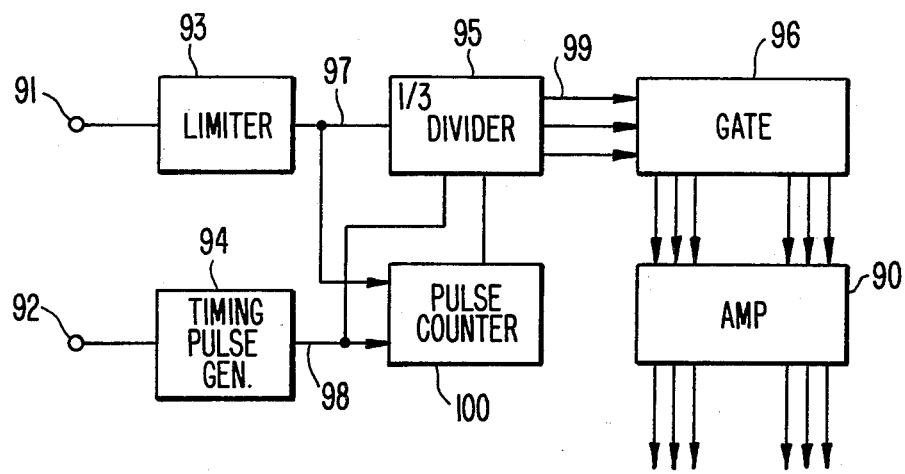

FIGS. 9A and 9B illustrate the index signal processing method. Electron beams scanning the index phosphor 62 are always "ON" except during predetermined horizontal and vertical blanking periods. Index signal 91, obtained from the photoelectric device 64 (see FIG. 6), is waveshaped by an amplifier and limiter 93 to obtain an index pulse signal 97. The frequency of the signal 97 is desided by horizontally scanning speed of the electron beam and a pitch of the index phosphor stripes. The signal 97 is divided into two and supplied to both a one-third divided 95 and a pulse counter 100. A timing pulse generator 94 generates a reset pulse 98 for the one-third frequency divider 95 using a television synchronizing signal 92. The frequency divider 95 divides the signal 97 after receiving the reset pulse and generates three phase pulse signals 99. The pulse counter 100 counts the number of pulses of the index pulse signal 97 after receiving the reset pulse 98 and generates a pulse signal when a predetermined number of pulses have been counted. The generated pulse signal from the pulse counter 100 clears the contents in the frequency divider 95. In the embodiment in FIGS. 9A and 9B, the pulse counter generates the pulse signal when six index pulses have been counted.

The three phase pulse signals 99 are supplied to a gate circuit 96 which gates the primary color output signals from the D-A converter 77 (see FIG. 7) by the three phase pulse signals 99. The output signals from the gate circuit 96 are time sequential color signals of $E_R \rightarrow E_G \rightarrow E_B$ and are supplied to the $G_1$ electrode to modulate the electron beam through an amplifier 90. The three phase pulse signals 99 may be supplied to the second line memory 76 (see FIG. 7) as timing pulses for controlling the read out timing of the second line memory 76 without the gate circuit 96.

Figure 11:
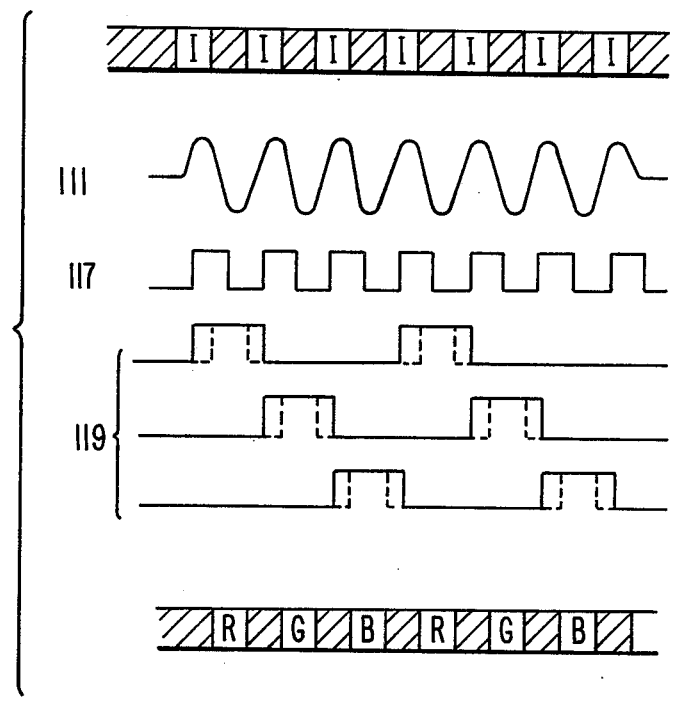
FIG. 11 is a waveform chart for explaining an index signal processing operation of the structure in FIG. (10)

FIG. 10 illustrates a second embodiment of the present invention. The embodiment in FIG. 10 is same as that in FIG. 6 except for the location of the index phosphor stripes 62 and the black stripes 61. The index signal processing of the embodiment in FIG. 10 is almost same as that in FIG. 6. The block diagram in FIG. 9A is also used for index signal processing of the embodiment in FIG. 10. FIG. 11 is a waveform chart in the case of the embodiment in FIG. 10. The index signal 111 from the photoelectric device 64 is waveshaped by the amplifier and limiter 93 to generate index pulse signal 117. The one-third frequency divider 95 devides the index pulse signal 117 and generates three phase pulse signals 119 shown by the dotted line in FIG. 11. The pulse counter 100 counts the index pulse signals 117 and generates a pulse output when seven pulses have been counted. The pulse output clears the contents in the one-third divider. In this case, the gate pulses 119 for gating the gate circuit 96 may be replaced by the pulses shown as solid lines in FIG. 11 which have a pulse width from one leading edge of the index pulse 117 to next leading edge thereof.

The embodiment makes it possible to compensate for the time delay which occurs from the detection of the index signals to the supplying of the color video signals to the $G_1$ electrode by providing a delay circuit means in the amplifier and the limiter 93.

Figure 12:
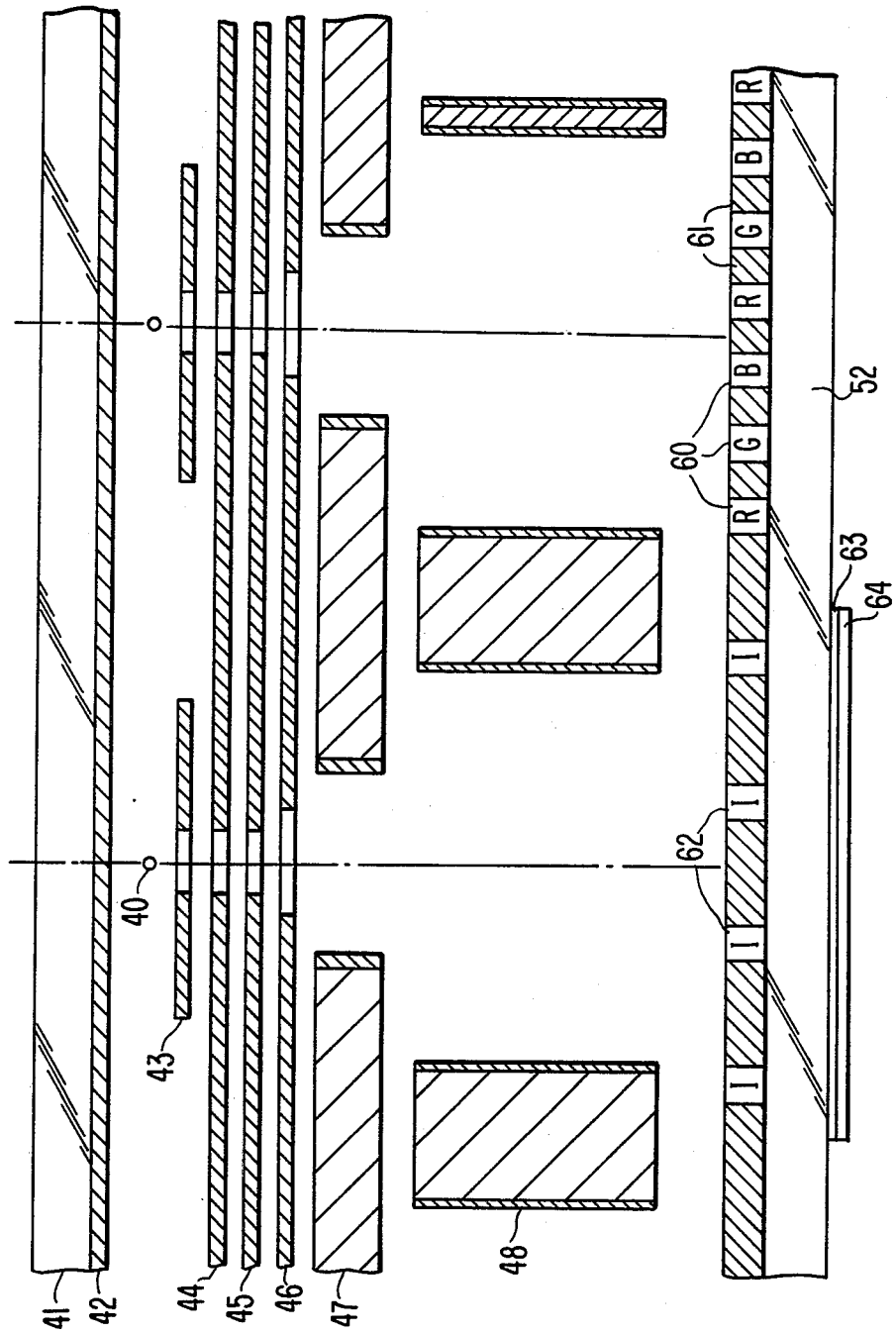
FIG. 12 is a cross-sectional plane view of a flat display tube in accordance with a third embodiment of the present invention.

Referring now to FIG. 12, a third embodiment of the present invention is illustrated. The embodiment corresponds to the embodiment in FIG. 10 from which alternate index phosphor stripes have been removed. The embodiment makes it possible to separate the index signal from the image display signals mixed in the photoelectric device by a bandpass filter because the index signal frequency is divided in half which is 1.5 times the fundamental frequency of the primary color signals.

Figure 13A:
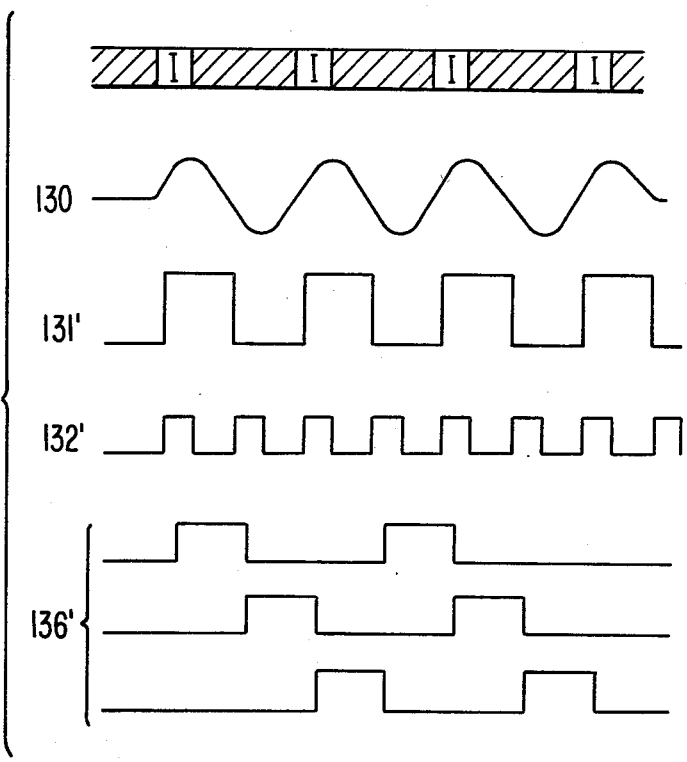
FIGS. 13A and 13B are a waveform chart and a block diagram of an index signal processing portion of the embodiment in FIG. 12.
Figure 13B:
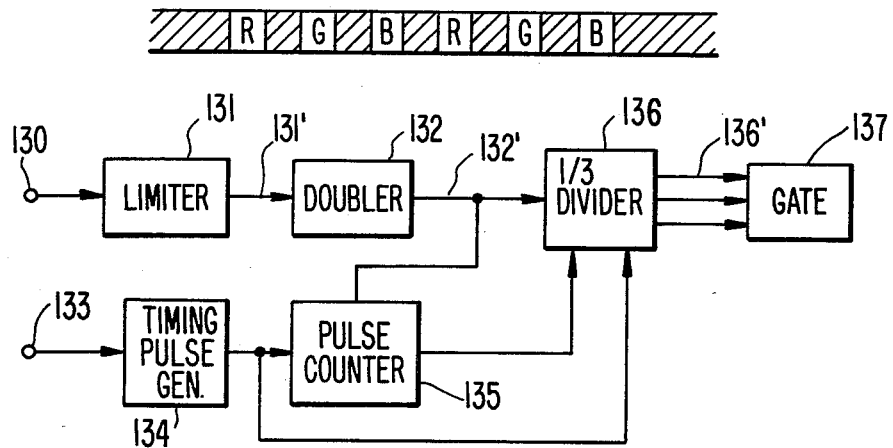

Referring to FIGS. 13A and 13B, an index signal processing will be explained.

An index signal 130 from the photoelectric device is supplied to a band-pass filter/limiter 131 to select the desired signals and to shape the waveform thereof. The output 131' of the band-pass filter/limiter 131 is doubled in frequency by a frequency doubler 132 to obtain index pulses 132' having triple the frequency of the triplet frequency. A timing pulse generator 134 generates reset pulses for a one-third frequency divider 136 and a pulse counter 135 using a television synchronizing signal 133. The frequency divider 136 generates three phase pulse signals 136' by dividing the index pulses 132' after receiving the reset pulse from the timing pulse generator 134. The pulse counter 135 counts the number of index pulses 132' after receiving the reset pulse from the timing pulse generator 134 and generates a clear pulse for clearing the contents of the frequency divider 136 when it has counted a predetermined number of index pulses 132'. The three phase pulse signals 136' are supplied to a gate circuit 137 or the second line memory 76 (see FIG. 7) in the same fashion as the embodiments shown in FIG. 6 or FIG. 10. If necessary, a delay circuit (not shown in FIG. 13) is provided in or after the frequency doubler 132 to adjust the timing of the modulating signal and the electron beam impinging location on the phosphor layer.

Figure 14:
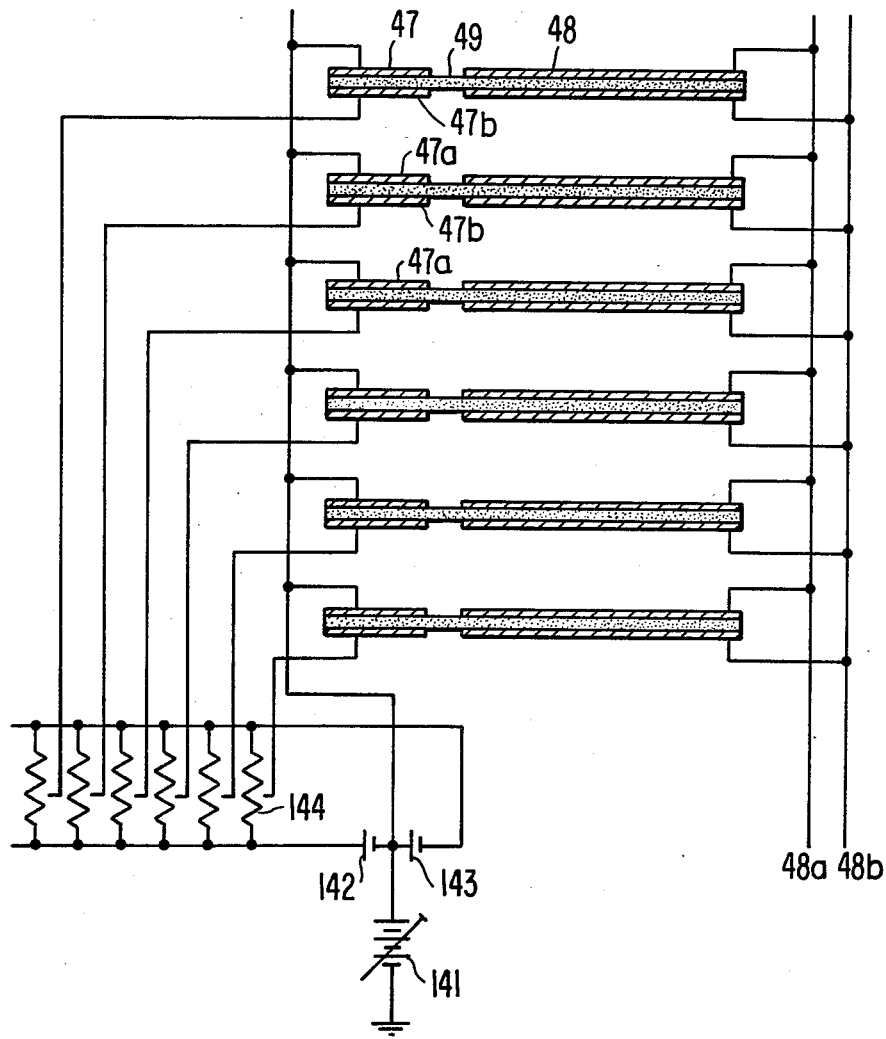
FIG. 14 is a circuit diagram for horizontal focusing and deflecting of the flat display device in accordance with the present invention.

FIG. 14 illustrates a horizontal deflection portion of the invention. The $F_H$ electrodes 47 and the $D_H$ electrodes 48 are provided separately on both sides of each insulating plate 49. The $F_H$ electrodes 47a on one side of each of the insulating plates 49 are connected commonly to a focussing power supply 141. Each of the other $F_H$ electrodes 47b is connected separately to dividual variable resistors 144 which are connected to a positive power source 143 and a negative power source 143 connected to the focussing power supply 141. Horizontal focussing of the electron beams is performed by adjusting the voltage of the focussing power supply 141. On the other hand, the landing location of the electron beams on the phosphor layer is regulated by adjusting the potential of the $F_H$ electrodes 47 individually with the variable resistors 144, whereby the electron beams are precisely landed on the desired locations of the phosphor layer. The voltage supplied to the $F_H$ electrode 47 is so small as to be about one-tenth of the voltage supplied to the phosphor layer so that it is possible to adjust the beam landing with a low voltage. This results in an easy and safety operation for adjusting the beam landing location.

The $D_H$ electrodes 48 on one side of each of the insulating plates 49 are connected commonly to a common lead 48a, while the $D_H$ electrodes 48 on the other side of each of the insulating plates 49 are connected commonly to another common lead 48b. Sawtooth wave signals or stepped signals for horizontal deflection are supplied to the common leads 48a and 48b.

Figure 15:
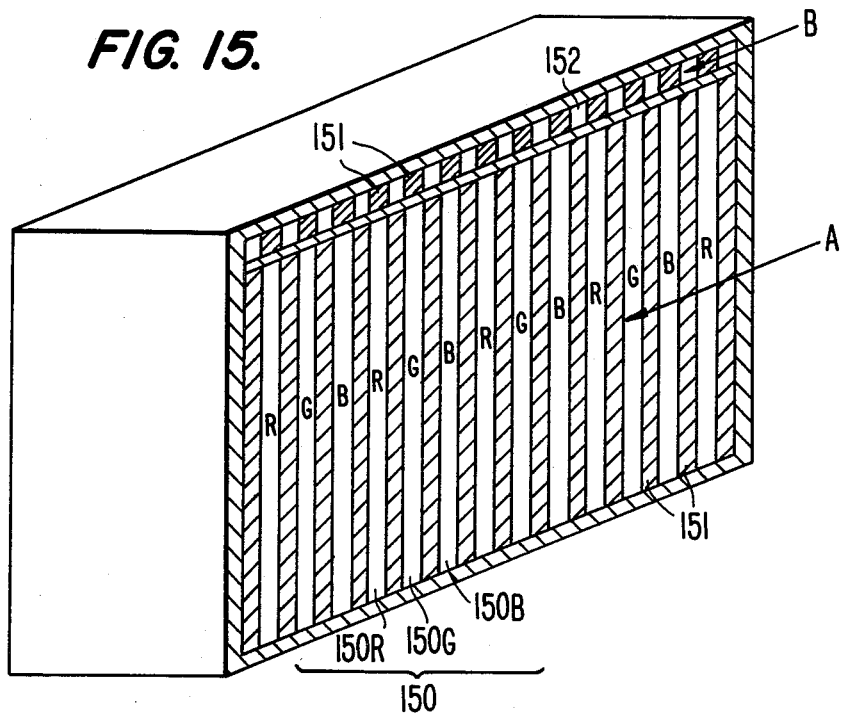
FIG. 15 is a perspective view of a flat display tube in accordance with a fourth embodiment of the present invention.
Figure 16:
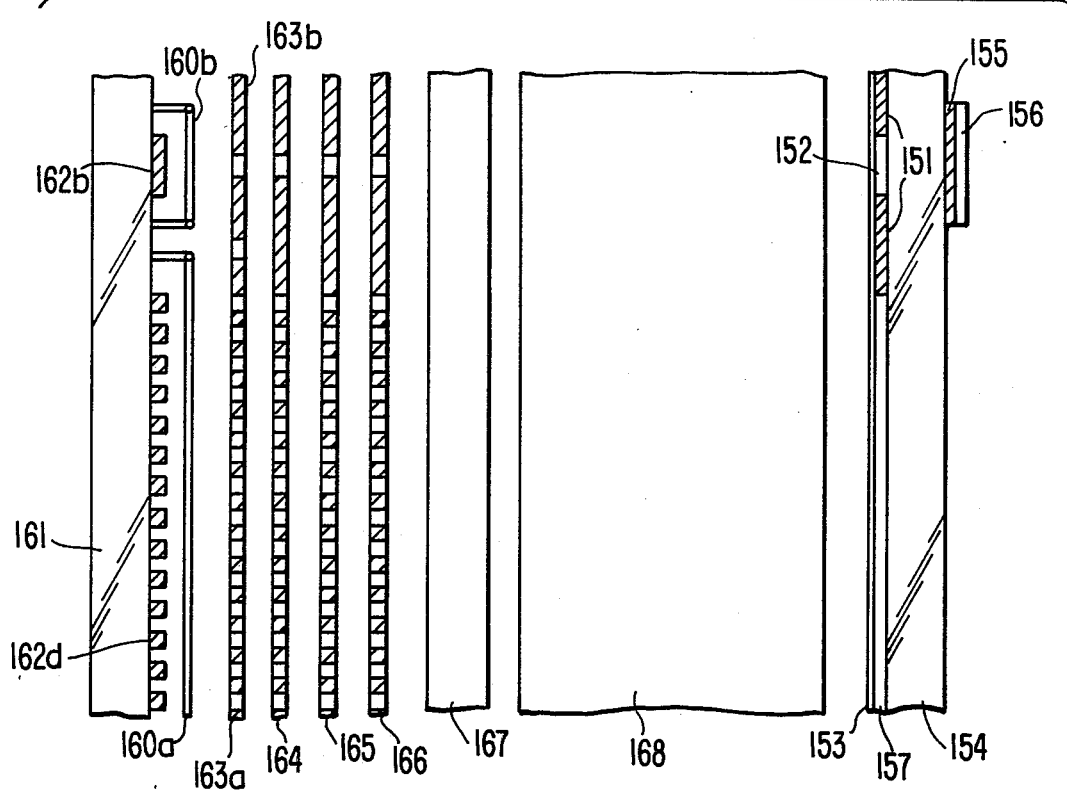
FIG. 16 is a cross-sectional side view of the structure of FIG. 15.

Referring to FIGS. 15, 16 and 17, a fourth embodiment of the present invention will be discussed. In image display region A (see FIG. 15), red, green and blue phosphor stripes 150R, 150G and 150G are provided successively with black stripes 151 therebetween in the horizontal direction. At the top of the image display region, an index region B consisting of index stripes 152 and black stripes 151 is provided. The index stripes 152 have the same pitch as that of the three primary color stripes 150 and are arranged alternately with the black stripes 151 in the horizontal direction. The electrode construction of the image display region is the same as that of FIG. 4. In the index region, linear cathodes 160b, rear electrode 162b, and $G_1$ electrode 163b are provided, as shown in FIG. 16, each separated from linear cathodes 160a, rear electrodes 162a and $G_1$ electrode 163a in the image display region. Other electrodes, such as $G_2$ electrodes 164, $G_3$ electrode 165, $G_4$ electrode 166, $F_H$ electrodes 167, and $D_H$ electrodes 168, are common with those in the image display region.

Figure 17A:
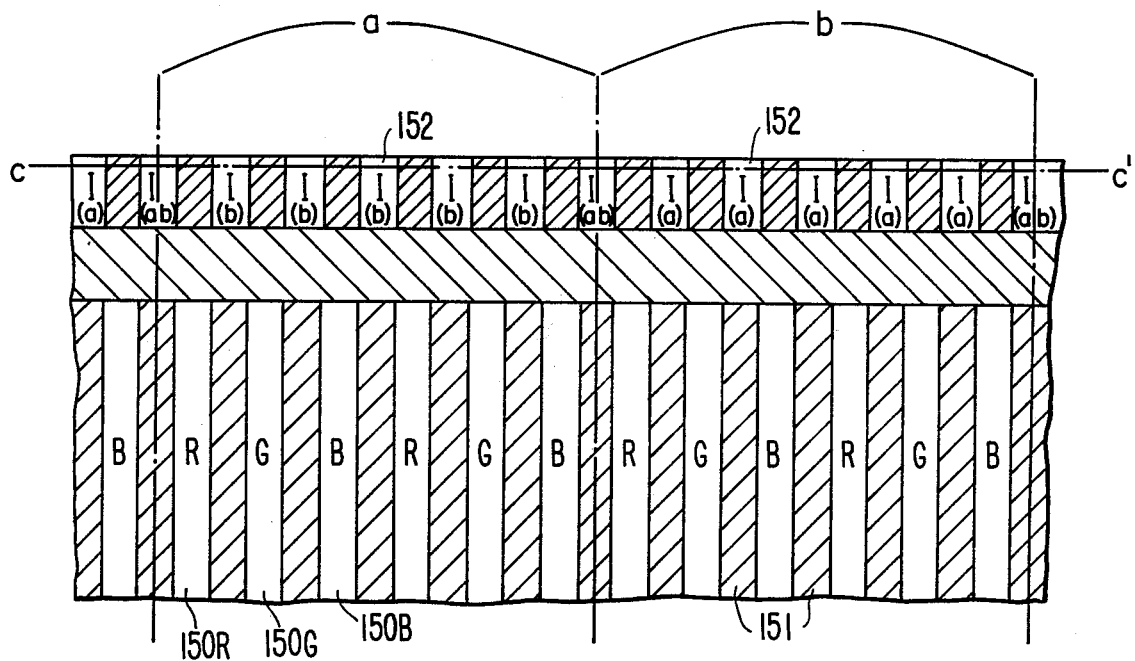
FIGS. 17A and 17B are a front view and cross-sectional view of a phosphor screen portion of the structure of FIG. 15.
Figure 17B:
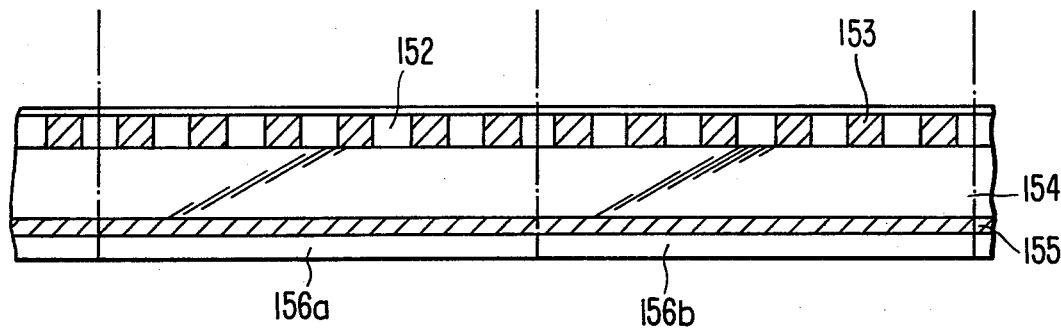

The phosphor screen portion is illustrated in FIGS. 17A and 17B. The index stripes 152 are arranged at positions corresponding to the black stripes 151 in the image display region. On the outside of a face plate 154, a filter means for transmitting index light from the index stripes 152 and photoelectric devices 156a, 156b, . . . for converting index light into electric signals are provided opposite to the index region in every cathode blocks a, b, . . . .

The rear electrode 162b is always supplied a DC voltage of a potential nearly equal to the cathode potential and therefore the cathodes 160b always emit electron beams towards the $G_1$ electrodes 163b. As a result, the index stripes always radiate index light at every cathode block. In this case, one index light often impinges upon a neighboring photoelectric device, which causes an error in detecting the precise beam scanning position. To avoid the error, the electron beam is modulated by a signal which is sufficiently higher in frequency than the index frequency, which is determined by the scanning speed of the beam and index stripe pitch, in one cathode block a, while the electron beam in the neighboring cathode block b is unmodulated. As a result, the index signals obtained in each of the cathode blocks are electrically separated in frequency and precise index signals are obtained.

Figure 18:
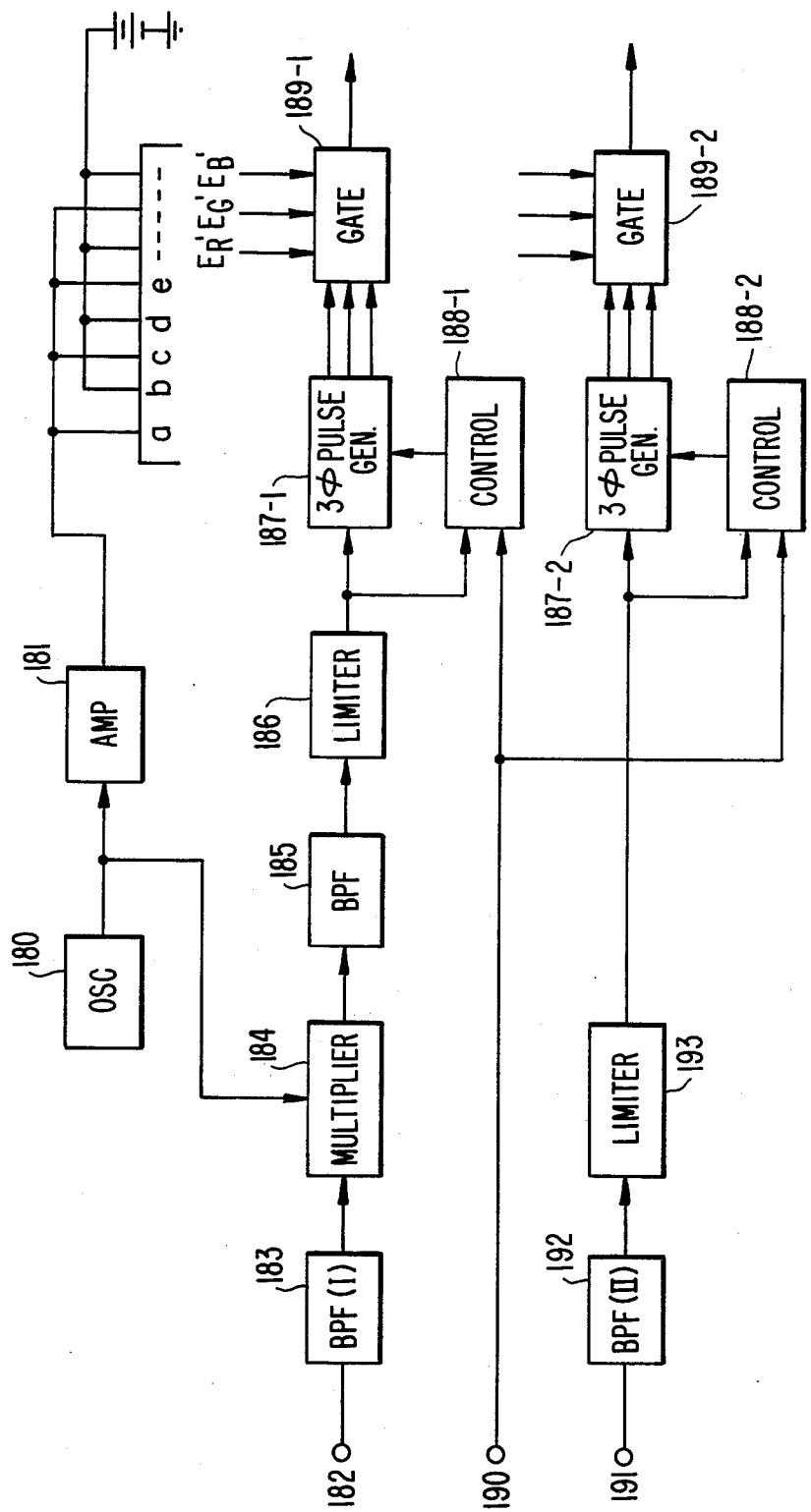
FIG. 18 is a block diagram of an index signal processing portion of a flat display device using the display tube in FIG. 15.
Figure 19:
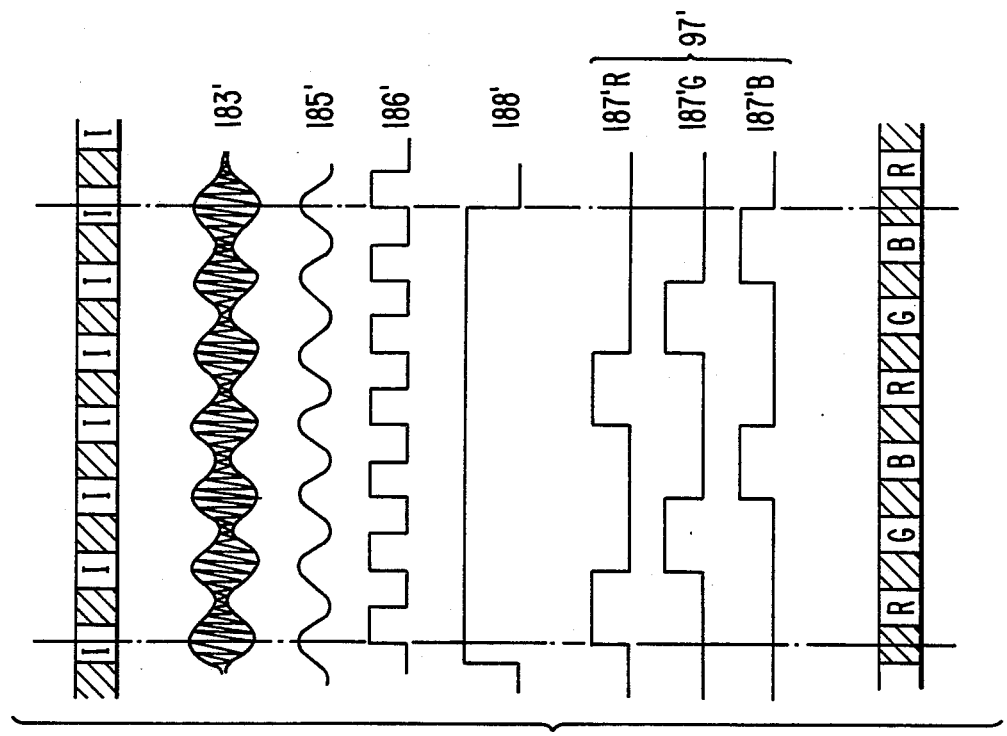
FIG. 19 is a waveform chart for explaining an index signal processing operation of the structure in FIG. 18.

Referring now to FIGS. 18 and 19, a method for regulating the timing of color signals supplied to the $G_1$ electrodes and the electron beam scanning position will be discussed. An oscillator 180 generates a signal having frequency $f_s$ which is of a frequency which is sufficiently higher than the frequency $f_i$ of the index signal, and is supplied to an amplifier 181. When the signal from the amplifier 181 is supplied to the $G_1$ electrodes a, c, e, . . . of the index region, index signal $E_{I-a}$ is described as $$E_{I-a} = E_i \cdot E_s \cos(2\pi f_s t + \phi_s)$$

where $E_i$ is the index signal when the index stripes are scanned by unmodulated electron beams. $E_s$ is the output signal of the oscillator 180, and $\phi_s$ is the phase of the output signal of the oscillator 180. The index signal $E_{I-a}$ is transferred to a bandpass filter 183 (hereinafter called BPF) for passing a frequency band of $(f_s+f_i)$ or $(f_s-f_i)$ and the output $E'_{I-a}$ of the BPF 183 is generated as follows.

$$E'_{I-a} = E_i \cdot E_s \cos\{2\pi(f_s+f_i)t + (\phi_s+\phi_i)\}$$

where $\phi_i$ is the phase of the index signal. The output $E'_{I-a}$ is shown as waveform 183' in FIG. 19. The output $E'_{I-a}$ of the BPF 183 is multiplied by a multiplier 184 with the signal from the oscillator 180 which generates a signal represented by the formula;

$$E[\cos(2\pi f_i t + \phi_i) + \cos\{2\pi(2f_s+f_i)t + (2\phi_s+\phi_i)\}]$$

A BPF 185 extracts the first term component of the above formula which corresponds to the index signal of the basic frequency obtained when an unmodulated electron beam scans the index region. The output of the BPF 185 is illustrated as waveform 185' in FIG. 19. The output 185' is shaped in waveform by a limiter 186, which includes a delay circuit for adjusting the timing between color signals for modulation and beam scanning position, to generate index pulse 186'. The index pulse 186' is supplied to a three phase pulse generator 187-1 and a control circuit 188-1. The control circuit 188-1 is also supplied a television synchronizing signal 190 and generates a reset pulse 188'. The reset pulse 188' rises when receiving the television synchronizing signal and falls when a pulse counter in the control circuit 188 has counted a predetermined number of index pulses 186'. The three phase pulse generator 187 generates three pulses 187'R, 187'G, and 187'B of 120° phase-shift with each other. The three pulses 187'R, 187'G and 187'B are supplied to a gate circuit 189-1 which gates each of primary color signals in the same fashion as the embodiments shown in FIGS. 9 and 13.

On the other hand, a constant DC voltage is supplied to each of the neighboring $G_1$ electrodes b, d, f, . . . , and therefore, unmodulated electron beams scan the index region. An index signal thus obtained is supplied to BPF 192 for passing the basic frequency component thereof. As a result, a signal which is similar to the aforementioned signal 181' is obtained from the BPF 192. The output of the BPF 192 is processed by limiter 193, three phase pulse generator 187-2, control circuit 188-2 and gate circuit 189-2 in the same manner as that previously described.

In the above explanation, an embodiment of connecting commonly every other $G_1$ electrode in the index region is described. It is possible to connect commonly the $G_1$ electrodes at intervals of n−1, where n is equal or larger than 2 and to modulate the electron beam with different frequency signals at every connection.

Figure 20:
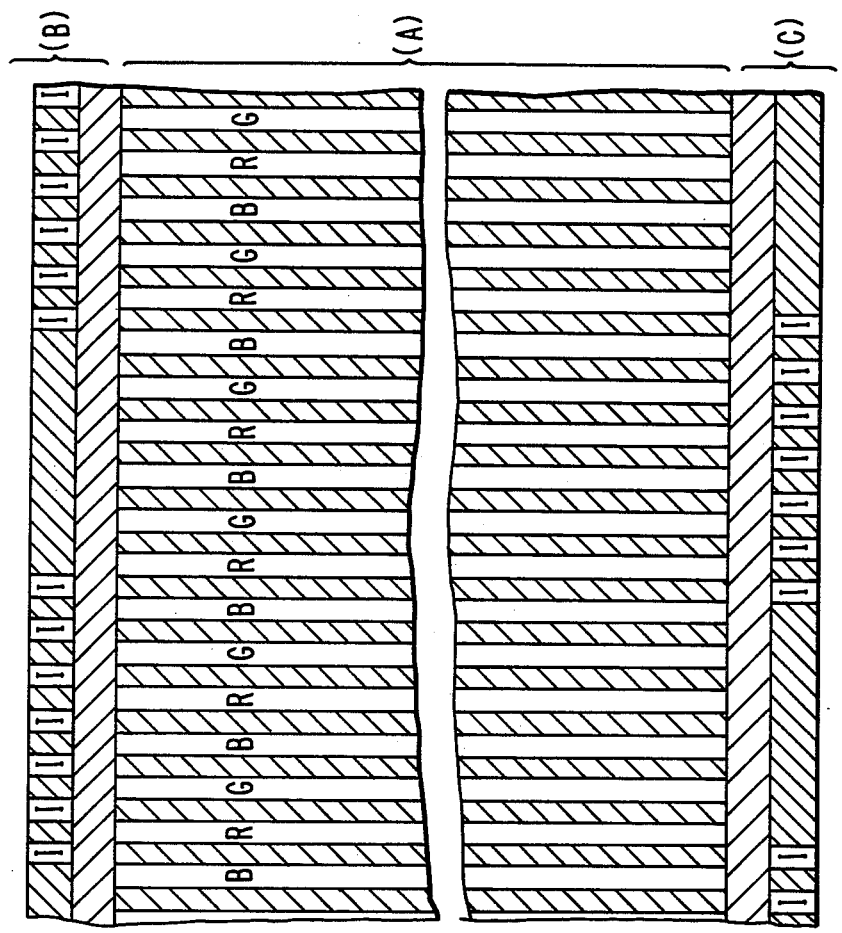
FIG. 20 is a front view of a phosphor screen of a flat display device in accordance with a fifth embodiment of the present invention.

Referring to FIG. 20, a fifth embodiment of the present invention is illustrated. In the embodiment, index region B and C are provided alternately at the top and bottom of an image display region A in every cathode block. At the corresponding positions of the index regions B and C, rear electrodes 162b, linear cathodes 160b, G₁ electrodes 163b and photoelectric devices 155 and 156 are provided similarly to the embodiment shown in FIG. 16. In this embodiment, index light emitted from the index stripes in the index region A do not reach the index region B, and therefore, the electron beams for scanning the index stripes may be unmodulated. Index signal processing is not explained here because it is very similar to the embodiment shown in FIG. 18.

Figure 21:
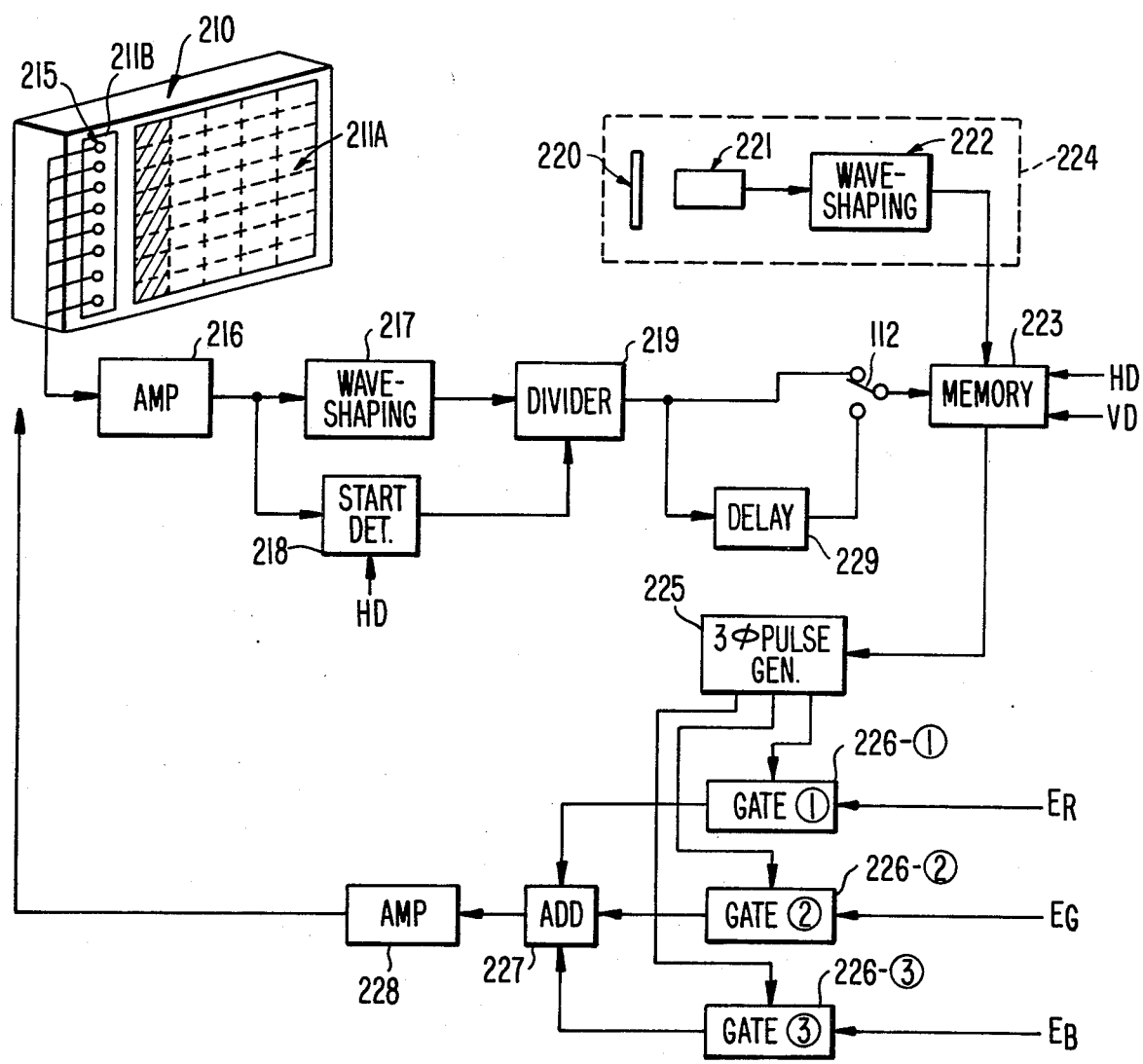
FIG. 21 is a block diagram of a flat display device in accordance with the sixth embodiment of the present invention.
Figure 22A:
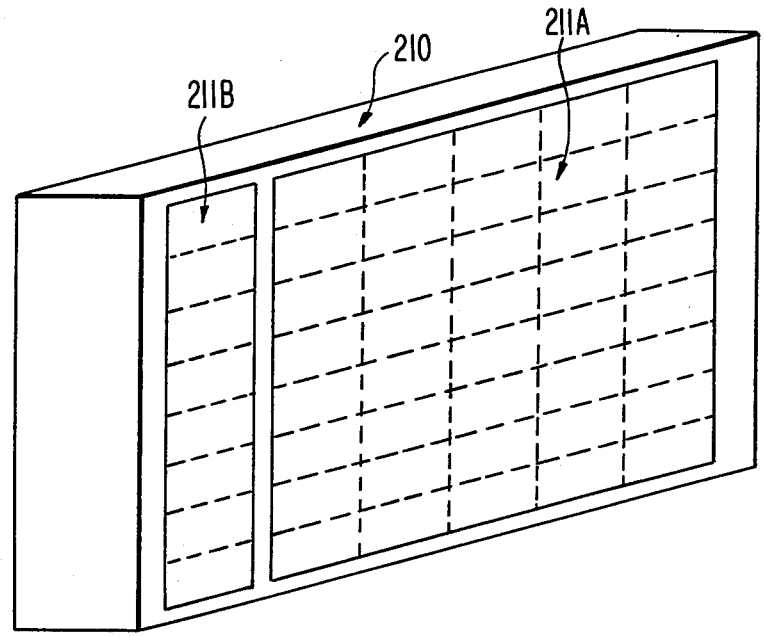
FIGS. 22A to 22C are a perspective view and conceptive views of a phosphor screen of the flat display device in FIG. 21.
Figure 22B:
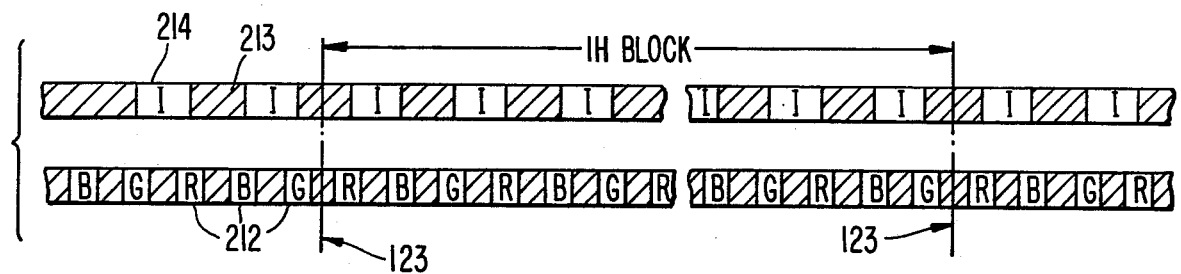
Figure 22C:
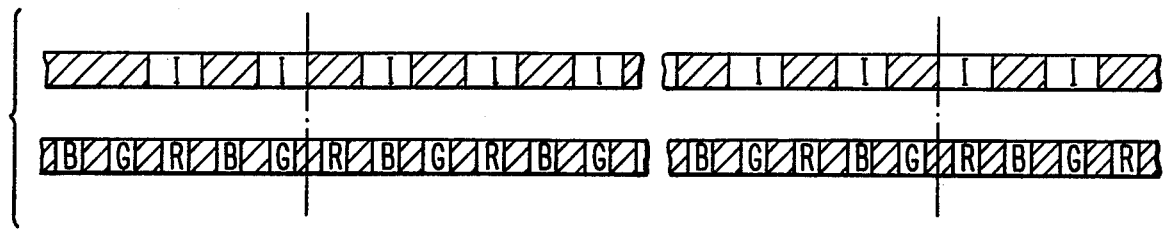

Referring now to FIG. 21, an embodiment of a color display device will be discussed. A flat color display tube 210 has an image display region 211A having a plurality of horizontal blocks and index region 211B having one horizontal block as shown by dotted lines. The index region 211B has black stripes 213 and index stripes 214 alternately having a pitch equal to two-thirds ($\frac{2}{3}$) of that of the three primary color stripes 212 in the image display region as shown in FIGS. 22A to 22C. The primary color stripes are arranged in the order of R-B-G. When number of trio (trio means a set of R, B, and G strips) is even in one horizontal block, the index stripes 214 are arranged in such a manner that the black stripe 214 in the index region is located at the location corresponding to the boundary of the one horizontal block as shown in FIG. 22B. When the number is odd, the index stripes 214 are arranged is such a manner that the boundary of the index stripe 214 is located at the location corresponding to the boundary of the one horizontal block as shown in FIG. 22C.

Figure 23:
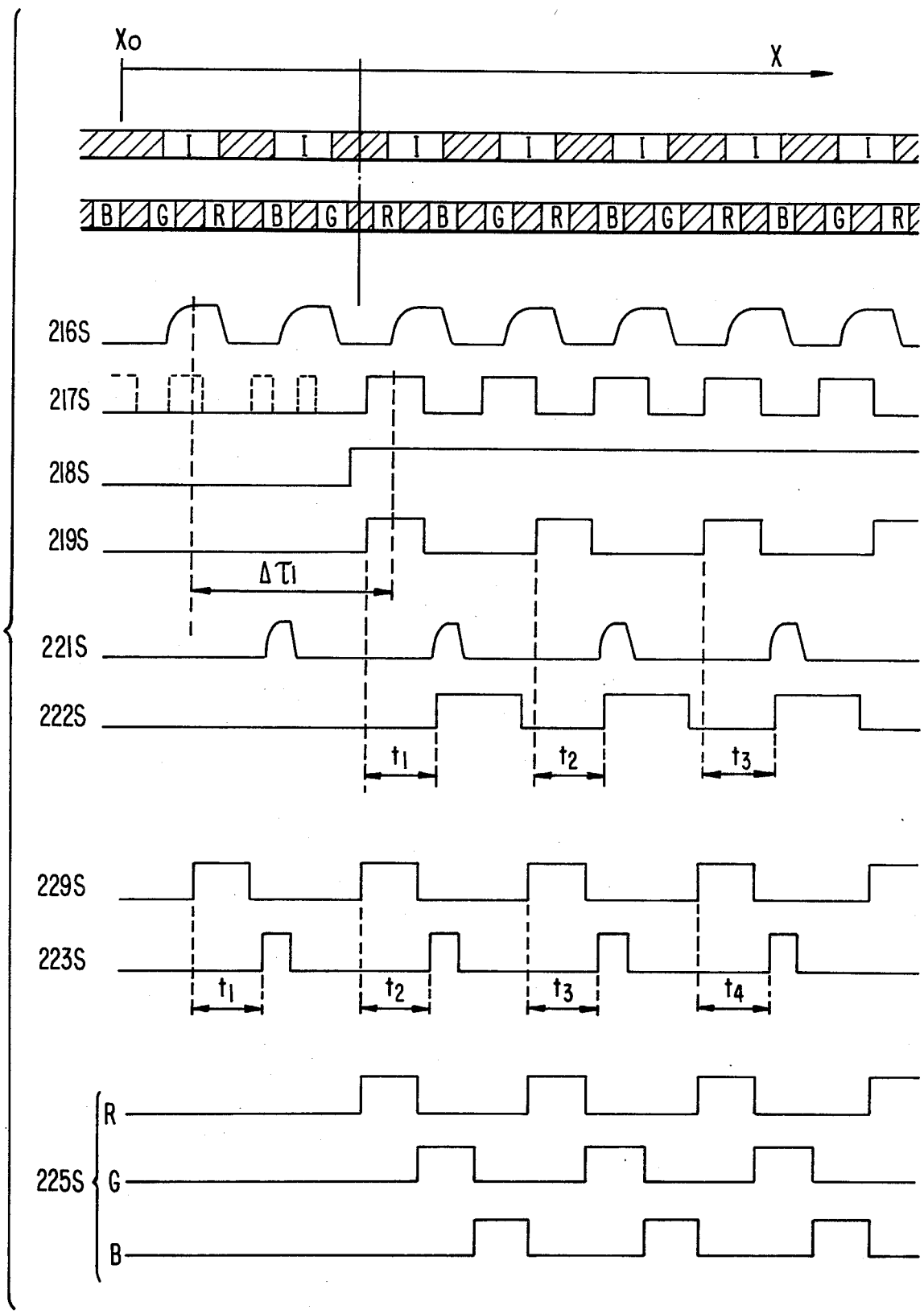
FIG. 23 is a waveform chart for explaining the operation of the block diagram is FIG. 21.

Referring back to FIG. 21, the index region 211B is always scanned by unmodulated electron beams and emits index light. The index light is converted into electrical signals by photoelectric devices 215 and amplified by an amplifier 216. The output of the amplifier 216 is shown as a waveform 216S. In FIG. 23, an arrow X represents the horizontal scanning direction and Xo a point from which the horizontal scanning is begun. The output 216S is shaped by a waveshaping circuit 216 which consists of a bandpass filter and limiter. The output signal 217S of the wave-shaping circuit 216 is delayed by the bandpass filter by the amount $\Delta \tau_1$. The output 216S of the amplifier 216 is also supplied to a start detector 218 for detecting the precise start position of the index signal to generate a divider starting signal 218S. A frequency divider 219 divides the frequency of the signal 217S into two-thirds ($\frac{2}{3}$) after receiving the divider starting signal 218S. The output signal 219S from the divider 219 has a frequency equal to the primary color triplet frequency, and is utilized as a reference signal for writing in and reading out of the memory 223.

On the other hand, only a hatched horizontal block in the image display region 211A is scanned by the unmodulated electron beam to emit light from the three primary color phosphor stripes 212. A light from the blue (B) phosphor stripes is selected by a filter 220 and converted into electrical signal 221S by a photoelectric device. In this case, a light from red (R) or green (G) phosphor stripes may also be practicable, but B light is superior in its signal to noise ratio because of the short duration characteristic of the blue phosphor. The output signal 221S of the photoelectric device 221 is shaped by a waveshaping circuit 222, which has essentially same structure as the waveshaping circuit 217, and outputs a signal 222S. The signal 222S is also delayed by the waveshaping circuit 222.

The signals 219S and 222S are supplied to a memory 223. In the memory 223, time intervals $t_1, t_2, t_3, \ldots$ between each leading edge of the signals 219S and 222S are written into predetermined addresses of the memory 223. The time intervals $t_1, t_2, t_3, \ldots$ are obtained by counting the number of clock pulses synchronized with the horizontal synchronizing signal in each of the intervals $t_1, t_2, t_3, \ldots$. The writing in timing is synchronized with the timing of the vertical and horizontal scannings. The stored intervals $t_1, t_2, t_3 \ldots$ correspond to timing signals of electron beam scanning on the B phosphor stripes obtained by horizontally scanning in one horizontal block. The storing operation is repeated as to the other horizontal blocks, whereby all of the timing signals of the electron beam scannings on the B phosphor stripes of the whole face of the tube are stored.

Figure 24A:
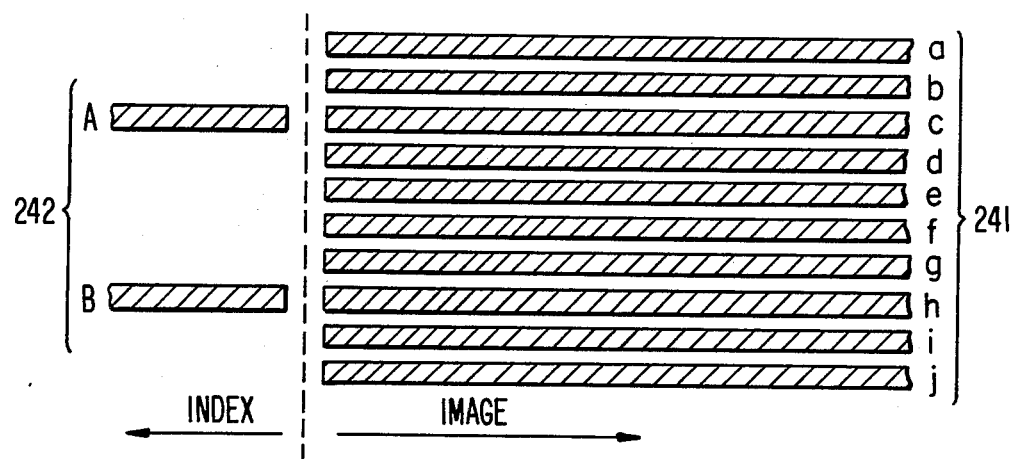
FIGS. 24A and 24B are a front view of vertical scanning electrodes and waveform chart of signals each of which is supplied to each of the vertical scanning electrodes.
Figure 24B:
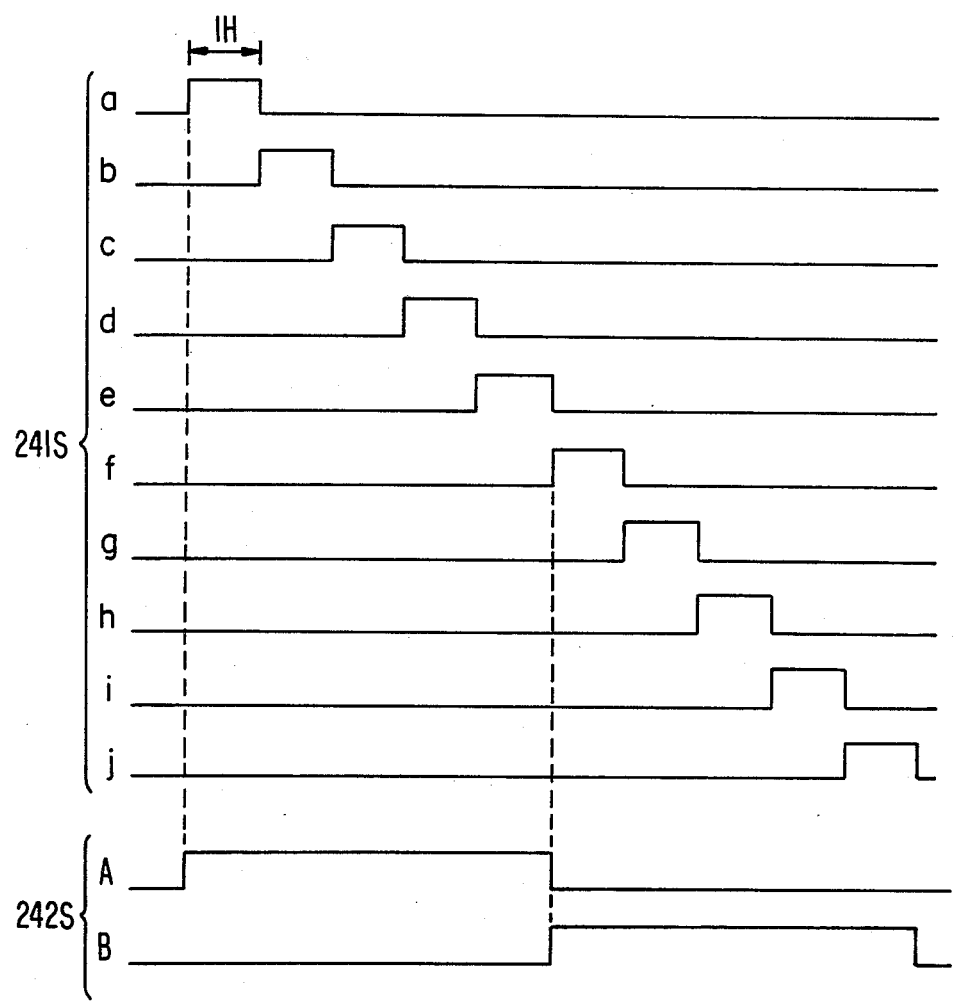

Referring to FIGS. 24A and 24B, the vertical scanning of the embodiment will be explained. In FIG. 24A, the image display region is illustrated at the right side of the dotted line and the index region is illustrated at the left side of the dotted line. In the image display region, a plurality of vertical scanning electrodes 241 of a number equal to the number of horizontal scanning lines in one field are arranged separately. The electrodes 241 are noted by symbols a, b, c, . . . . In the index region, a plurality of vertical scanning electrodes 242 are also arranged separately with the number at intervals of n electrodes in the image display region, where n is an integer equal to or larger than 2. The example in FIG. 24A illustrates the case when n=5. It does not always follow that the width of the electrodes 242 is equal to that of the electrodes 241.

The waveforms of the signals supplied to the electrodes 241 and 242 are illustrated in FIG. 24B. In FIG. 24B, the same notations are labelled with those of the electrodes 241 and 242 in FIG. 24A. Each of the electrodes 241a, 241b, 241c, . . . in the image display region are excited by each of pulses 241s-a, 241s-b, 241s-c, . . . having a pulse width of 1H period so as to generate electron beams. On the other hand, each of the electrodes 242A, 242B, . . . in the index region are excited by each of the pulses 242S-A, 242S-B, . . . having a pulse width of 5 H periods to generate electron beams during 5 H periods. Therefore, during five horizontal scanning areas a, b, c, d, and e in the image display region, five horizontal scannings on same trace are performed in the index region and not scanned vertically. According to the above embodiment, horizontal scanning lines are reduced into one-nth (1/n) and the number of photoelectric devices for detecting the index light are also reduced.

After storing all of the timing signals of the electron beam scannings on the blue phosphor stripes in the image display region 211A, a block 224 surrounded by the dotted frame is removed and the operation of displaying a color image is begun. The stored signals in the memory 220 are held if power source is shut off by using a non-volatile memory. The index region 211B is continued to be horizontally scanned by the electron beams during color image display operation and generates signals 219S as in the case of memory writing.

The reading out from the memory 223 is performed with reference to the signal 229S which is generated by the delay circuit 229. The read out signal from the memory 223 is a pulse signal 223S having a predetermined width, each rectangular pulse thereof is delayed by intervals $t_1, t_2, t_3, \ldots$ from the leading edge position of the signal 229S. The pulse signal 223S is supplied to a three-phase pulse generator 225 which generates three pulses 225S-R, 225S-G, and 225S-G of different phase with respect to each other. Each of the three pulses 225S-R, 225S-G, and 225S-G is added respectively to gate circuits 226-1, 226-2, and 226-3. The gate circuits 226-1, 226-2 and 226-3 gate three primary color signals $E_R$, $E_G$, and $E_B$ with the pulse signals 226-1, 226-2 and 226-3. The gated color signals $E_R$, $E_G$ and $E_B$ are added by an adder 227 and supplied to the $G_1$ electrode of the display tube 210 through an amplifier 228. The circuit blocks for processing the output signal 223S of the memory 223 are provided as same number as that of horizontal blocks of the image display region.

The delay circuit 229 is provided for compensating for the delay time $\Delta\tau_1$ of the index signal 219S for of the same reason described in the embodiments shown in FIGS. 10 and 18. The delay circuit 229 delays the signal 219S by the delay $t_H - \Delta\tau_1$, where $t_H$ is one horizontal scanning time. Raster distortion is hardly generated between adjacent horizontal scanning lines, which allows a strong correlation between the angular frequency and relative phase in the signal obtained from the index region. As a result, the delay operation of the delay circuit 229 is able to compensate for the delay of the signal 219S. A switch 112 in FIG. 21 is provided for the purpose of changing input signals to the memory 223. When the memory 223 is read out in accordance with the delayed signals 229S from the delay circuit 229, high quality color reproduction without chromatic distortion is obtained.

The delay circuit 229 may be provided at the output position of the amplifier 217 or the waveshaping circuit 217 in place of the output position of the frequency divider 219.

In the time delay compensation method described above, electron beam scanning in the index region 211B is must be performed earlier in timing of one horizontal scanning time than that in the image display region 211A.

The time delay compensation may be realized by exchanging the signals to be written in the memory 223, which correspond to $t_1$, $t_2$, $t_3$, . . . in FIG. 23, with signals obtained by subtracting $\Delta\tau_1$ commonly from the signals $t_1$, $t_2$, $t_3$, . . . . This is realized by reducing $\Delta\tau_1/tck$ clock pulses from clock pulses counted in $t_1$, $t_2$, $t_3$, . . . respectively, where tck is one period of the clock pulse.

Figure 25:
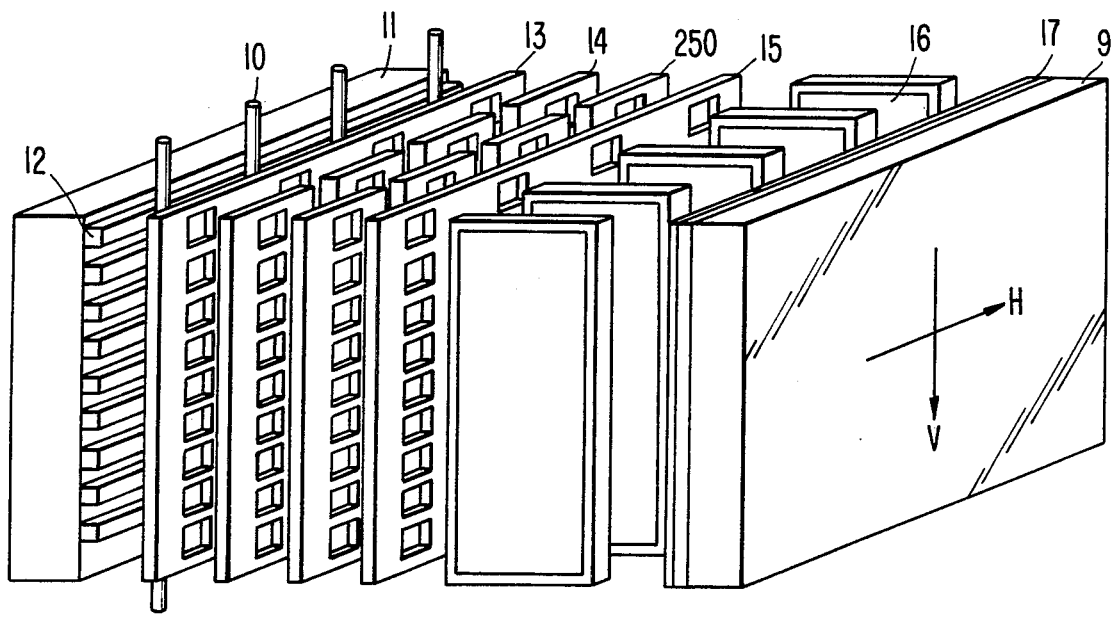
FIG. 25 is a perspective view of a flat display device in accordance with a seventh embodiment of the present invention.
Figure 26:
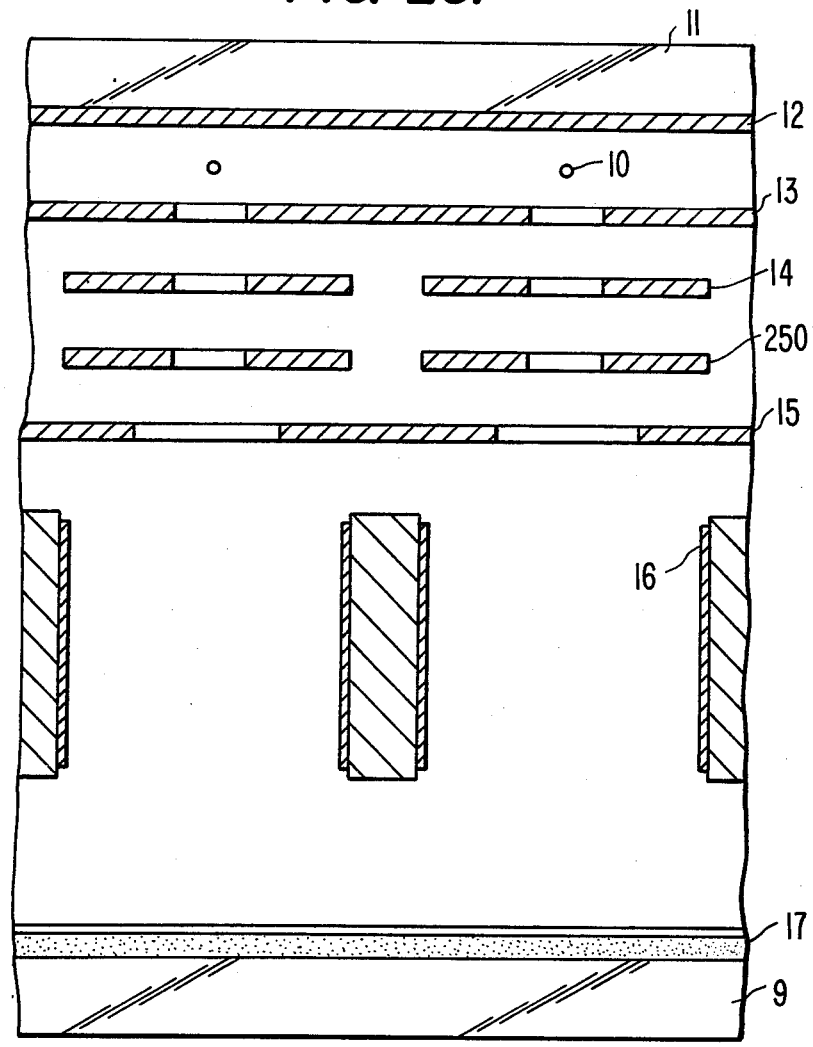
FIG. 26 is a cross-sectional plane view of the structure in FIG. 25.

Referring now to FIGS. 25 and 26, a seventh embodiment of a flat display device according to the present invention will be explained. The structure is similar to that shown in FIGS. 1 and 2 except for electrodes 250, and same numerals are used for corresponding parts. The electrodes 250 have the same construction as that of $G_2$ electrodes 14.

Figure 27:
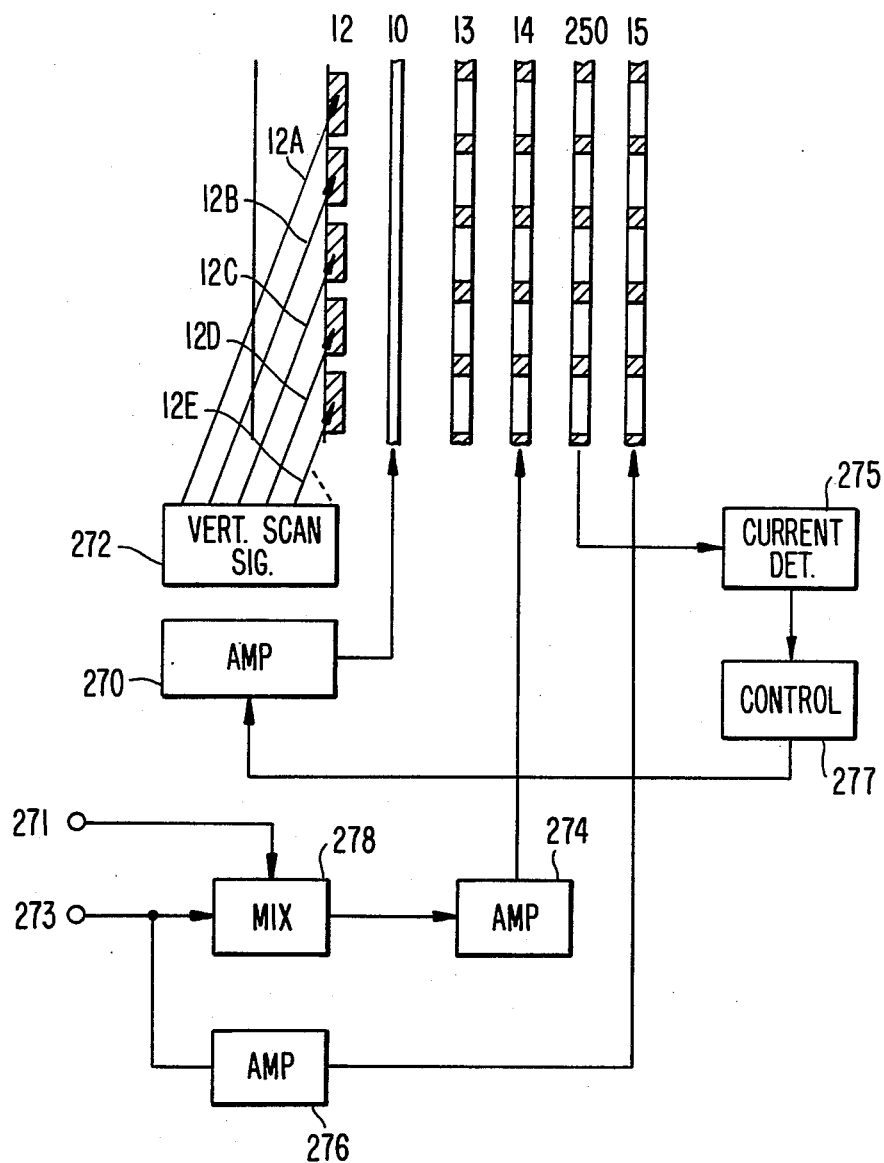
FIG. 27 is a block diagram for operating the structure in FIG. 25.
Figure 28:
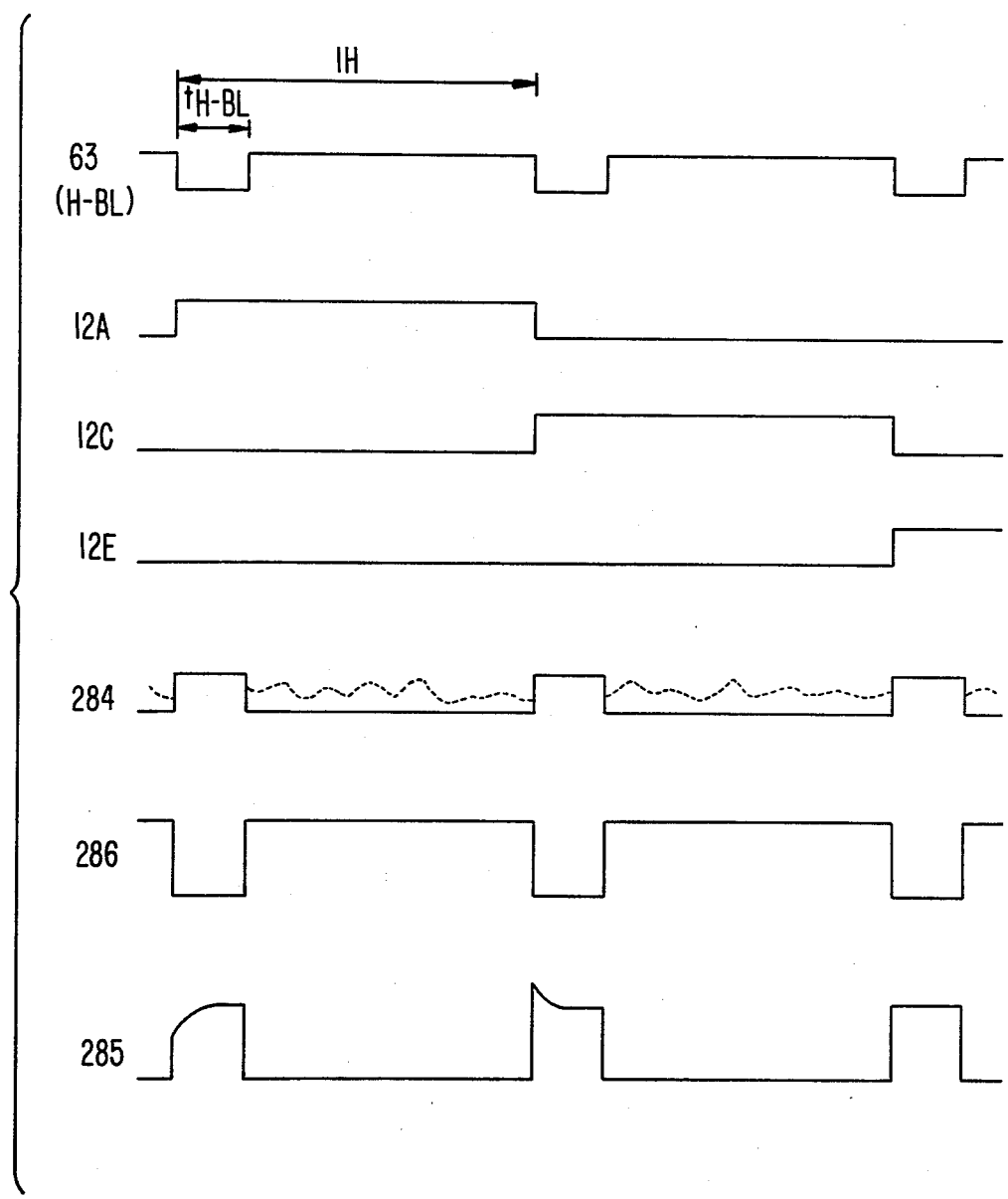
FIG. 28 is a waveform chart for explaining the operation of the block diagram in FIG. 27.

Now, the operation of the embodiment will be discussed by FIGS. 27 and 28. Vertical scanning is essentially same as the case shown in FIG. 3. A vertical scanning power supply 272 supplies pulses 12A, 12C, 12E, . . . having 1H pulse widths to the vertical scanning electrodes 12A, 12C, 12E, . . . shown in FIG. 27 sequentially. On the other hand, the $G_2$ electrode 14 is excited by a pulse 284 having a predetermined voltage which is enough to make a constant electron beam pass through the aperture of the $G_2$ electrode during horizontal blanking (hereafter called "H-BL") interval $t_{H-BL}$ at the beginning of 1H scanning. To perform this operation, the image signal 271 and the H-BL signal 273 are mixed in a mixer 278 to generate signal 284 and is supplied to the $G_2$ electrode 14 through an amplifier 274. When the H-BL signal 273 is supplied to the $G_2$ electrode 14, the electron beam impinges on the phosphor screen 17 through the aperture of the $G_2$ electrode 14. As a result, an undesired light is emitted. Therefore, the electron beam must be shut off from the phosphor screen during $t_{H-BL}$. To shut off the electron beam, the H-BL signal 273 is amplified by an amplifier 276 and the output signal 286 of the amplifier 276 is supplied to the $G_3$ electrode 15.

In the mean time, a current obtained from each of the electrodes 250 by the electron beam flowing therein is detected by a detector 275. The detected current is proportional to the amount of the electron beam, and therefore, it is possible to detect the nonuniformity of the electron beam by detecting the current from the electrodes 250. The detected current is supplied to a control circuit which generates a control signal for controlling the amount of the electron beam uniformly in $t_{H-BL}$. The control signal 285 is amplified by a cathode driving amplifier 270 and supplied to the linear cathode 10. As a result, the amount of the electron beam is kept at a constant value. The controlled cathode potential is held during 1H interval. According to the embodiment, it is possible to improve the non-uniform brightness of images caused by the nonuniformity of the electron beams.

In the embodiment, the control signal 285 may be supplied to the amplifier 274 to adjust the amplification factor thereof in place of supplying the control signal 285 to the amplifier 270.

Figure 29:
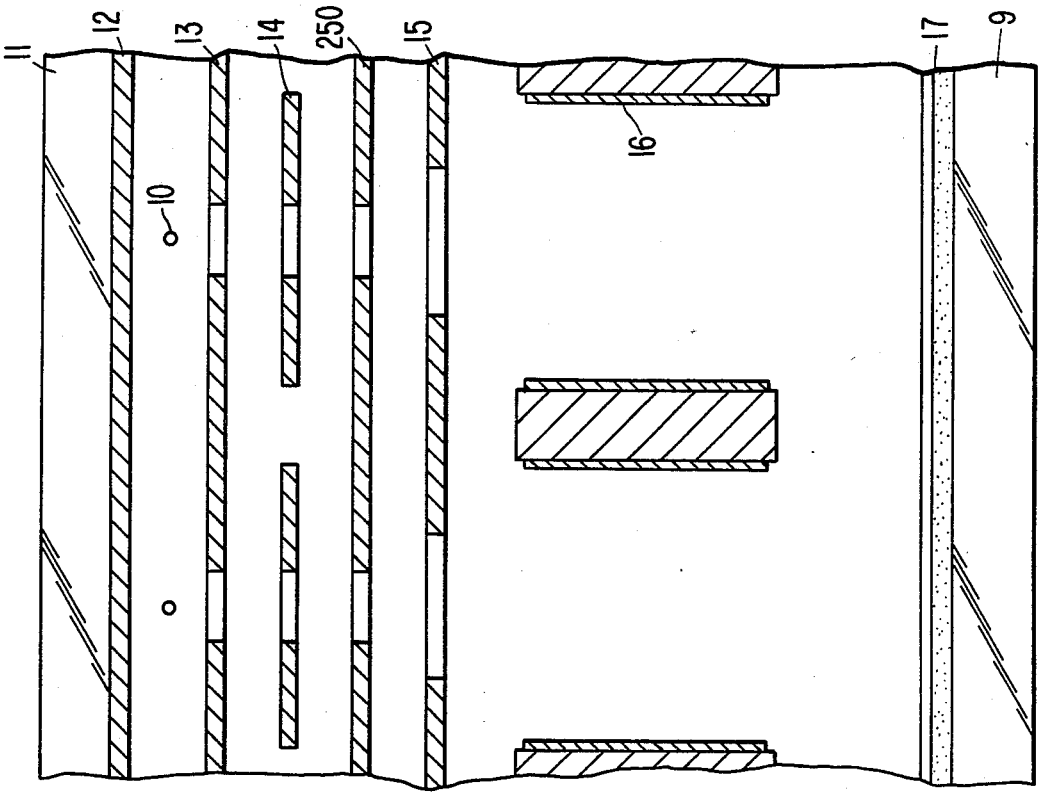
FIG. 29 is a cross-sectional plane view of a flat display device in accordance with an eighth embodiment of the present invention.

FIG. 29 discloses an eighth embodiment of the present invention. The electrode construction is essentially the same as that shown in FIG. 26 except for the electrode 250. In this embodiment, the electrode 250 is not divided and has the same structure as the $G_1$ electrode 13.

Figure 30:
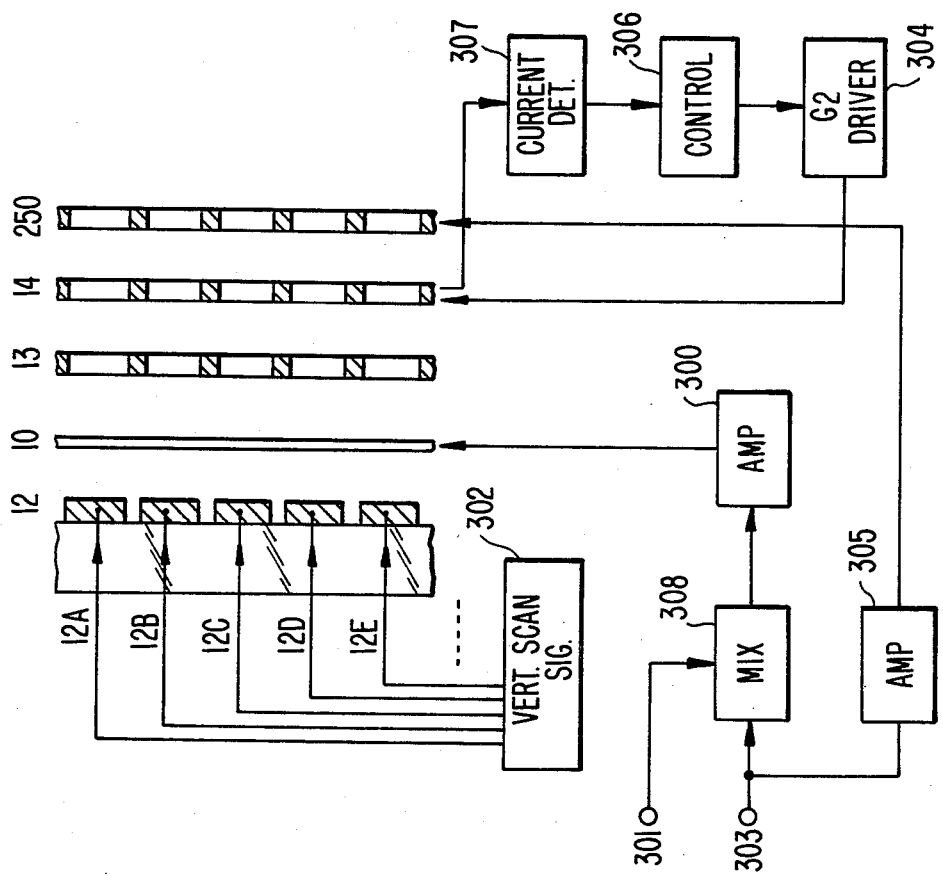
FIG. 30 is a block diagram for operating the structure in FIG. 29.
Figure 31:
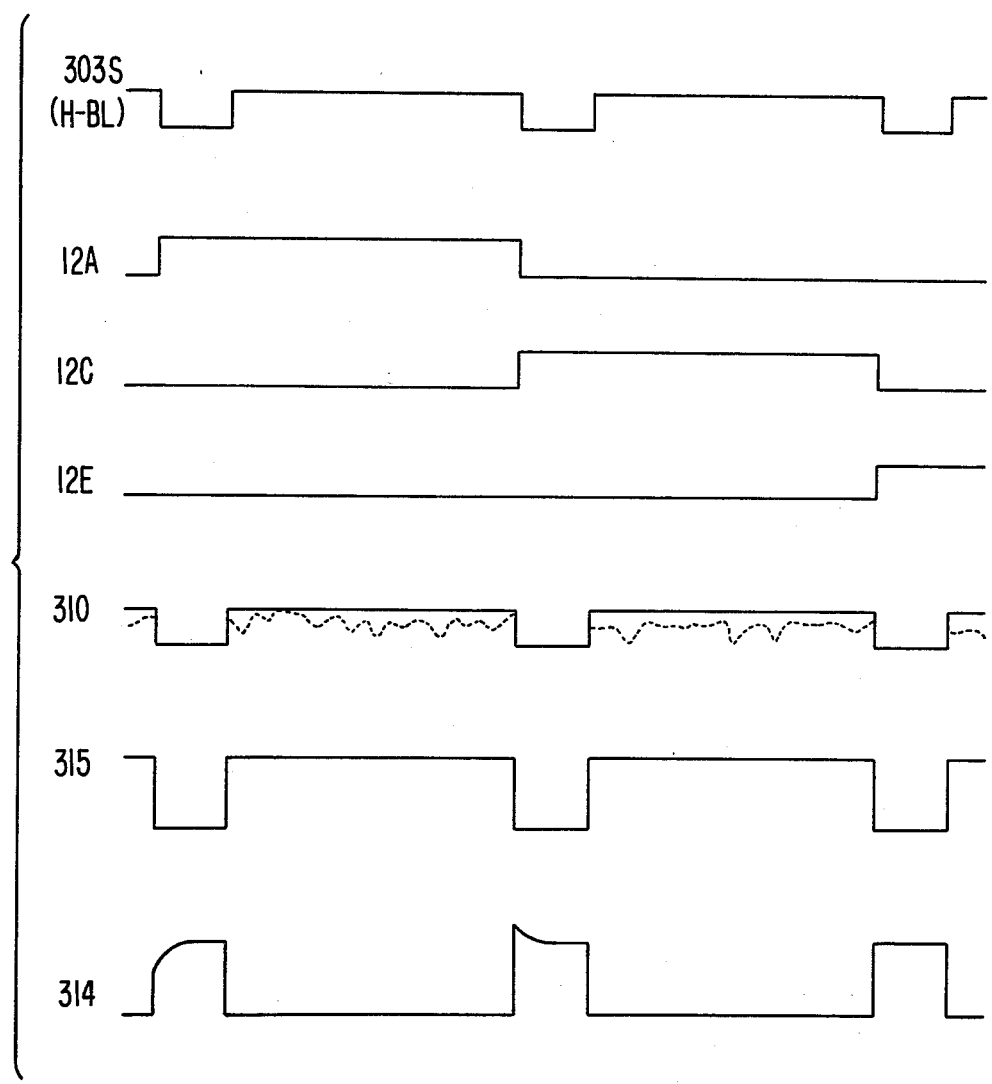
FIG. 31 is a waveform chart for explaining the operation of the block diagram in FIG. 30.

The operation of the embodiment will now be discussed in reference to FIGS. 30 and 31. The operation of the vertical scanning electrodes 12 is same as the embodiments shown in FIGS. 26, 27 and 28. The $G_2$ electrode 14 is excited by a pulse 310 having predetermined voltage which is high enough to make a constant electron beam pass through the aperture of the $G_2$ electrode during H-BL interval at the beginning of 1H scanning. To perform this, image signal 301 and H-BL signal 303 are mixed in a mixer 308 to generate signals 310 and supplied to the cathode 10 through an amplifier 300. In this case, the electron beam emitted from the cathode 10 must be shut off from the phosphor screen during H-BL intervals as is the case in the embodiments shown in FIGS. 26, 27 and 28. To shut off the electron beam, the H-BL signal 303 is amplified by an amplifier 305 and the output signal 315 of the amplifier 305 is fed to the electrode 250.

In the mean time, a current obtained from each of the $G_2$ electrodes 14 by the electron beam flowing therein is detected by a detector 307. The detected current is proportional to the amount of the electron beam, so it is possible to detect the uniformity of the electron beam by detecting the current from the $G_2$ electrodes 14. The detected current is supplied to a control circuit 306 which generates a control signal for controlling the amount of the electron beam uniformly in B-HL interval. The control signal is fed to a $G_2$ electrode driving circuit 304 to drive the $G_2$ electrode 14. The controlled $G_2$ electrode potential is held during 1H interval.

Figure 32:
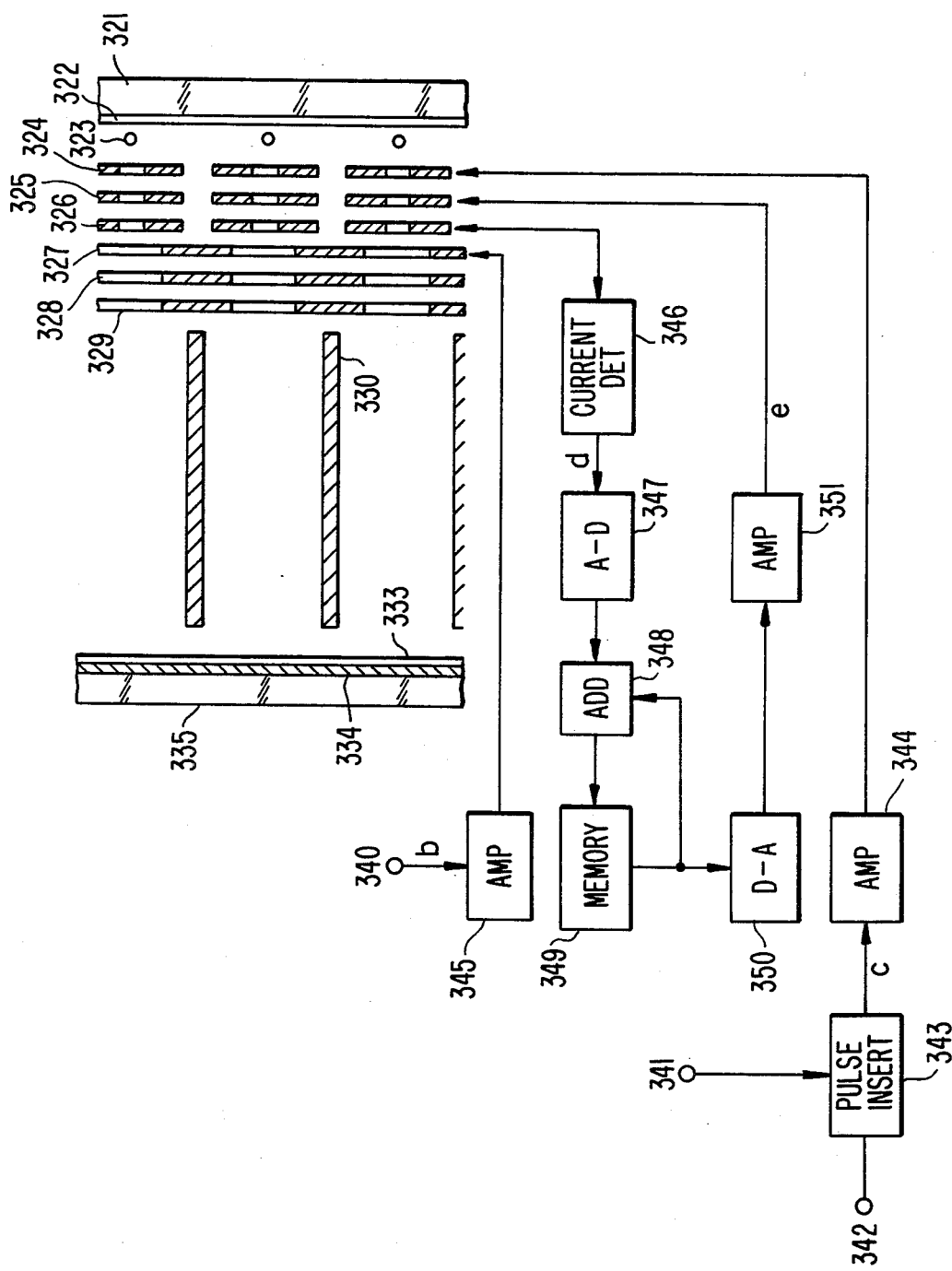
FIG. 32 is a cross-sectional view of a flat display device and a block diagram for operating the same in accordance with a ninth embodiment of the present invention.
Figure 33:
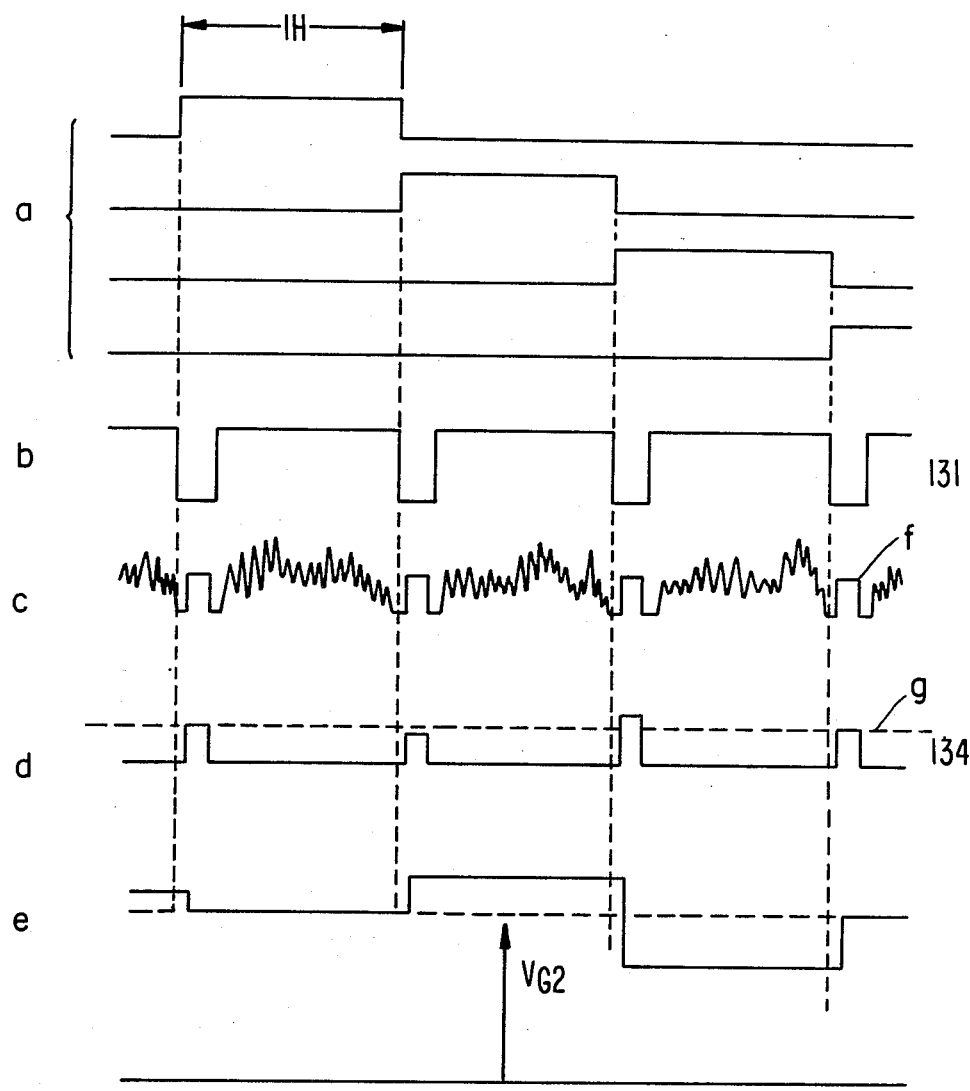
FIG. 33 is a waveform chart for explaining the operation of the block diagram in FIG. 32.

Referring to FIG. 32, a ninth embodiment of the present invention is disclosed. In this embodiment, $G_1$ electrodes 324, $G_2$ electrodes 325, and $G_3$ electrodes 326 are divided corresponding to linear cathodes 323 respectively. Element 327 is a fourth grid electrode (hereafter called a "$G_4$ electrode"), 328 and 329 are vertical diflection electrodes, and 330 is a horizontal deflection electrode. On the inner side of a face plate 335, phosphor stripes 334 and a metal back electrode 333 are provided. These are the same as those of the previous embodiments. Vertical scanning electrodes 322 have the same structure as those of FIG. 24A to each of which a pulse a having 1H pulse width as shown in FIG. 33 is supplied sequentially. The pulse a rises up in intervals of H-BL. In the interval of H-BL, the $G_1$ electrode 324 is excited by a predetermined voltage f so as to take out electron beams from the cathode 323. At the same time, an image signal for modulating the electron beam is supplied to the $G_1$ electrode 324. To perform this, the image signal from a terminal 342 is mixed with a pulse signal having predetermined pulse width from a terminal 341 in a pulse insertion circuit 343 during H-BL interval. The output C of the pulse insertion circuit is amplified by an amplifier 344 and fed to the $G_1$ electrode 324. A pulse b from a terminal 340 for shutting off the beam from the phosphor screen 334 is amplified by an amplifier 345 and added to the $G_4$ electrode to prevent the electron beam scanning on the phosphor screen during the H-BL interval. The electron beam generated during the H-BL interval flows into the $G_3$ electrode through the electrodes $G_1$ and $G_2$ and is detected by a current detector 346. The detected current d has a different pulse amplitude because of the difference of each of the cathode positions, aperture sizes of the $G_1$ electrode 324, and so on. The detected current is compared with a reference signal g having a fixed level, and the difference is converted into digital signal by an A-D converter 347. The output signal from the A-D converter 347 is fed to a one-field memory 349 through an adder 348. The operation of the adder 348 will be described later. The above operation is performed for all of the electron beams from the linear cathode 323 and the values for all of beam currents during one field interval are stored.

In the next field scanning, the stored corresponding signal is read out from the memory 349 and converted into an analog signal by a D-A converter 350. A control amplifier 351 amplifies the analog signal from the D-A converter 350 into a predetermined level and supplies its output signal e to the $G_2$ electrode 325. At this time, the signal e is kept in same potential during each of 1H intervals.

According to the above operation, the electron beam emission characteristics to the phosphor screen become uniform.

The adder 348 is provided for obtaining more precise uniformity. When a small nonuniformity of the beam characteristics exists by the above operation, the adder 348 adds the output signal of the A-D converter 347 and the output signal of the memory 349 corresponding to signal from one field before and the sum is fed into the memory 349. In this manner, the current flowing onto the $G_3$ electrode 326 converges to a constant value.

What is claimed is:

1. A flat display tube comprising:
  a plurality of linear cathodes arranged equidistance in horizontal direction;
  a plurality of strip electrodes elongated to the direction perpendicular to the linear cathodes arranged at rear of said linear cathodes with equal pitch,
  an electrode arranged at front side of said linear cathodes for regulating the amount of electron beams which arrive on a phosphor screen,
  a plurality of electrodes arranged at front side of said regulating electrode,
  means for supplying a signal for shutting off the electron beams to one of said plurality of electrodes during horizontally blanking interval at beginning of horizontally scanning,
  means for detecting beam current flowed into a front electrode of the electrode to which the shutting off signal is supplied, and
  means for adjusting electron beam in such a manner that the detected current detected by said detecting means becomes predetermined value.

2. A flat display tube as claimed in claim 1, wherein said plurality of electrodes consist of a beam modulating electrode, a current detecting electrode, and a beam focussing electrode, wherein beam shutting off signal is supplied to the beam focussing electrode.

3. A flat image display tube as claimed in claim 1, wherein said plurality of electrodes consist of a beam modulating electrode, a beam focusing electrode, and an electrode inserted between said two electrodes, wherein beam shutting off signal is supplied to said inserted electrode and detecting the beam current from said beam modulating electrode.

4. A flat image display tube as claimed in claim 1, wherein said electron beam regulating electrode is divided corresponding to said linear cathodes each having an aperture for passing electron beam therethrough, and said plurality of electrodes consist of two electrodes having same structure as said electron beam regulating electrode and one plane electrode having apertures at the position corresponding to said linear cathodes.

5. A flat image display tube as claimed in claim 1, further comprising means for comparing said detected current with a reference signal, means for memorizing a signal which is obtained by adding the output of said comparing means after converting into digital signal to the corresponding signal obtained one field before, and means for supplying the output of said memorizing means to said beam modulating electrode after converting into analog signal.

6. A color display device as claimed in claim 1, wherein said memorizing means memorizes a signal which is obtained by subtracting $\Delta\tau_1$ from the interval signal corresponding to the output of said counter, wherein $\Delta\tau_1$ is an interval from a beginning of index scanning to a time when a color video signal processed by an index signal is fed to a modulating electrode of the display device.

7. A color display device comprising;
  a flat color image display tube having image display region and index region arranged outside of the image display region, said image display region has three primary color phosphor stripes, each is sequentially arranged alternately with black stripes in horizontal direction, and said index region has index phosphor stripes,
  means for scanning said index region by electron beam in synchronism with scanning said image display region by electron beams,
  a photoelectric means for generating a reference signal by converting index light into electric signal, means for detecting a timing signal of electron beams which scan said three primary color phosphor stripes in the image display region, means for memorizing phase difference between said reference signal and timing signal, and means for controlling the timing of supplying color video signals to said display tube by signals read out from said memorizing means in accordance with said reference signal.

8. A color display device as claimed in claim 7, wherein said three primary color phosphor stripes are arranged in the order of red, blue and green, and said timing signal is detected from said blue phosphor stripes.

9. A color display device as claimed in claim 7, wherein said index region is arranged outside in horizontal direction of said image display region, and said reference signal is obtained by horizontally scanning all of index stripes in said index region.

10. A color display device as claimed in claim 7, wherein said index region has vertical scanning electrodes of number of one-nth of that of vertical scanning electrodes in said image display region, where n is an integer.

11. A color display device as claimed in claim 7, wherein said memorizing means includes a clock pulse generator for generating a clock pulse having higher frequency than that of said reference signal, and a counter for counting said clock pulse in an interval from rising up or rising down time of said reference signal to rising up or rising down time of said timing signal.

12. A color display device as claimed in claim 7, wherein said reference signal is delayed by $1H - \Delta\tau_1$ when said memorizing means is read out, where 1H is one horizontal scanning interval and $\Delta\tau_1$ is an interval from beginning of index scanning to a time when a color video signal processed by index signal is fed to modulating electrode of the display device.

* * * * *